(12) United States Patent
Dovey

(10) Patent No.: US 11,209,084 B2
(45) Date of Patent: Dec. 28, 2021

(54) SEAL, AIRCRAFT INCLUDING THE SEAL, AND METHODS THEREFOR

(71) Applicant: The Boeing Company, Chicago, IL (US)

(72) Inventor: John V. Dovey, Seattle, WA (US)

(73) Assignee: The Boeing Company, Chicago, IL (US)

( * ) Notice: Subject to any disclaimer, the term of this patent is extended or adjusted under 35 U.S.C. 154(b) by 264 days.

(21) Appl. No.: 16/426,724

(22) Filed: May 30, 2019

(65) Prior Publication Data

US 2020/0378499 A1    Dec. 3, 2020

(51) Int. Cl.
| | |
|---|---|
| *B33Y 80/00* | (2015.01) |
| *B33Y 10/00* | (2015.01) |
| *B33Y 70/00* | (2020.01) |
| *F16J 15/02* | (2006.01) |
| *B64C 3/50* | (2006.01) |

(52) U.S. Cl.
CPC ............. *F16J 15/024* (2013.01); *B33Y 80/00* (2014.12); *B64C 3/50* (2013.01); *B33Y 10/00* (2014.12); *B33Y 70/00* (2014.12)

(58) Field of Classification Search
CPC ...... F16J 15/024; F16J 15/3276; F16J 15/104; F16J 15/3244; B64C 3/50; B64C 9/02; B64C 7/00; B33Y 80/00; B33Y 10/00; B33Y 70/00; B22F 3/1115; B22F 5/106; Y02T 50/40
See application file for complete search history.

(56) References Cited

U.S. PATENT DOCUMENTS

| | | | |
|---|---|---|---|
| 3,486,720 A | 12/1969 | Seglem et al. | |
| 8,038,103 B2 * | 10/2011 | Lacy | B64C 9/16 244/211 |
| 8,567,726 B2 * | 10/2013 | Lacy | B64C 9/16 244/211 |
| 8,657,236 B2 | 2/2014 | Triches, Jr. et al. | |
| 9,227,719 B2 | 1/2016 | Khorrami | |
| 2014/0163445 A1 | 1/2014 | Pallari et al. | |
| 2017/0011155 A1 | 1/2017 | Ruto et al. | |
| 2018/0243997 A1 | 8/2018 | Selvasekar et al. | |
| 2018/0251919 A1 | 9/2018 | Mankame et al. | |

(Continued)

FOREIGN PATENT DOCUMENTS

GB    2504744    2/2014

OTHER PUBLICATIONS

Dovey, John; U.S. Appl. No. 16/160,002, filed Oct. 15, 2018.
(Continued)

*Primary Examiner* — Rick K Chang
(74) *Attorney, Agent, or Firm* — Perman & Green, LLP

(57) ABSTRACT

A seal for sealing a space between a first structure and second structure. The seal includes a seal base configured to couple with the first structure so as to form a respective seal with the first structure, a resilient lattice body coupled to the seal base, and a cover. The cover includes an inner surface coupled to the resilient lattice body in an opposing relationship relative to the seal base so that the cover moves towards and away from the seal base in a biasing direction of the resilient lattice body, and a bulbous outer surface configured to engage the second structure so as to form a respective seal with the second structure.

20 Claims, 15 Drawing Sheets

(56) References Cited

U.S. PATENT DOCUMENTS

2018/0264718 A1 9/2018 McCluskey
2018/0265023 A1 9/2018 Faruque et al.

OTHER PUBLICATIONS

Moon et al.; "Application of 3D Printing for Designing Light-Weight Unmanned Aerial Vehicle Wing Structures", International Journal of Precision Engineering and Manufacturing-Green Technology, vol. 1, No. 2, 2014 pp. 223-228; https://link.springer.com/content/pdf/10.1007%2Fs40684-014-0028-x.pdf.

Krassenstein, "San Draw Creates 3D Printed Lattice Seals", Sep. 14, 2016; https://3dprintboard.com/showthread.php?26524-San-Draw-Creates-3D-Printed-Lattice-Seals.

* cited by examiner

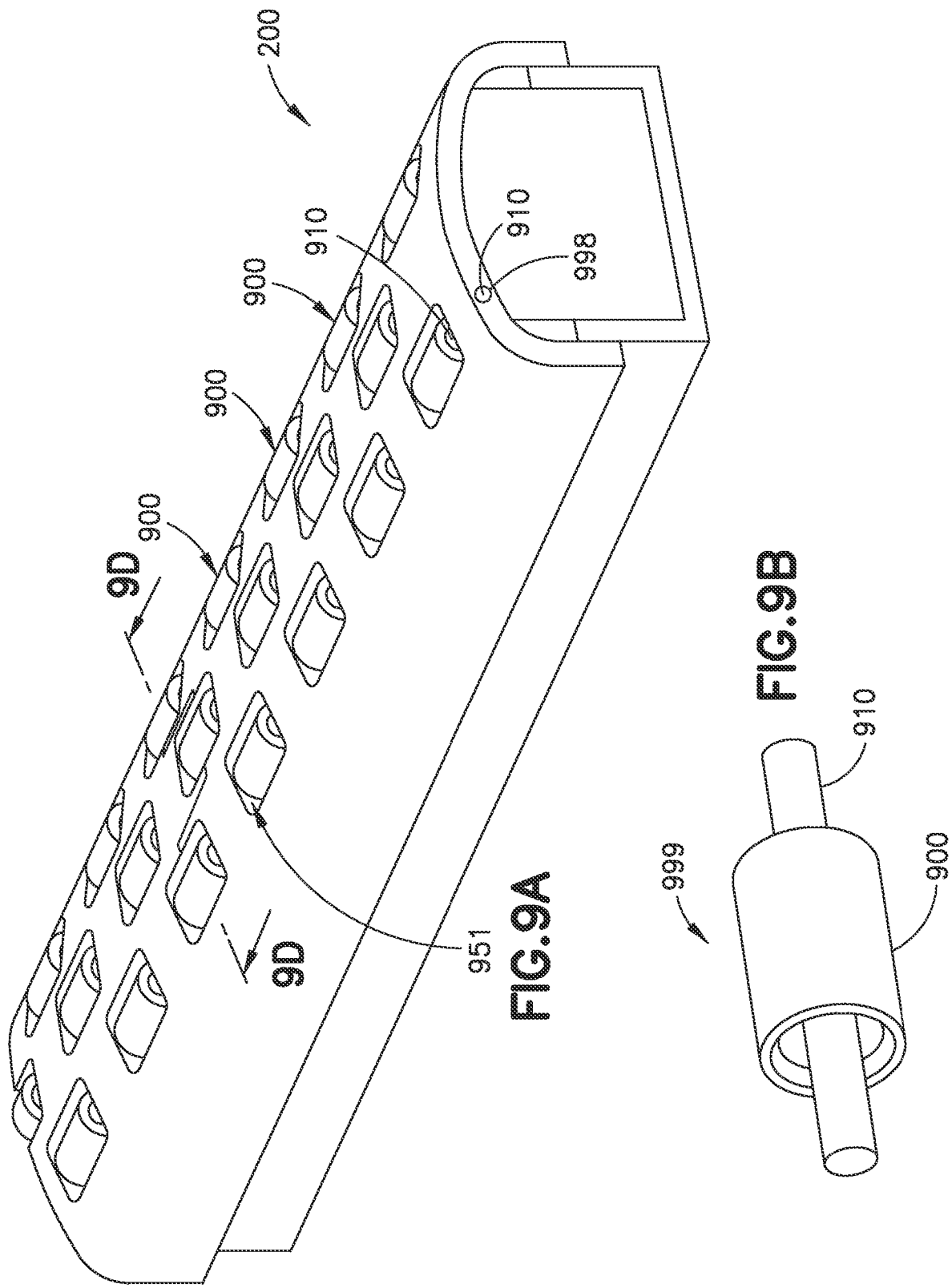

SEAL, AIRCRAFT INCLUDING THE SEAL, AND METHODS THEREFOR

BACKGROUND

1. Field

The exemplary embodiments generally relate to seals and more particularly to seals for sealing surfaces that move relative to each other.

2. Brief Description of Related Developments

Aircraft wings, empennage, landing gear, and body fairings generally include a large number and variety of aerodynamic seals to close gaps (also referred to herein as spaces) between surfaces thereof for optimal/increased aerodynamic performance and reduced noise. In some instances these aerodynamic seals are formed of molded elastomers (e.g., such as silicone rubber) to provide flexibility and may include a sailcloth material on exteriors of the seals to reduce friction on the contact surfaces of the seals. Due to a lack of stiffness in the seals, the seals are generally held in place with separate retainer plates or channels and multiple fasteners. Elastomeric seals are also generally heavy and expensive to manufacture, especially custom-molded seals with unusual geometry. Production of elastomeric seals is a labor-intensive process that generally uses expensive molds. Cleanly trimming and drilling the elastomeric seals is also difficult due to the nature of the elastomeric material.

It is also noted that the elastomeric seals are common wear items on aircraft and are replaced on a regular basis. Replacement of the seals creates downtime for the aircraft, which in turn increases operating costs of the airline operators. Failed seals can depart the aircraft, contributing to foreign object debris (FOD). The elastomeric seals may also bulge or deflect out of shape and protrude into the airstream flowing around the aircraft, decreasing the aerodynamic performance of the aircraft, which in turn may increase fuel costs.

SUMMARY

Accordingly, apparatuses and methods intended to address, at least, the above-identified concerns would find utility.

The following is a non-exhaustive list of examples, which may or may not be claimed, of the subject matter according to the present disclosure.

One example of the subject matter according to the present disclosure relates to a seal for sealing a space between a first structure and second structure, the seal comprising: a seal base configured to couple with the first structure so as to form a respective seal with the first structure; a resilient lattice body coupled to the seal base; and a cover comprising an inner surface coupled to the resilient lattice body in an opposing relationship relative to the seal base so that the cover moves towards and away from the seal base in a biasing direction of the resilient lattice body, and a bulbous outer surface configured to engage the second structure so as to form a respective seal with the second structure.

Another example of the subject matter according to the present disclosure relates to an aircraft comprising: a wing; a control surface coupled to the wing so as to move relative to the wing; and a seal disposed between the wing and the control surface so as to aerodynamically seal a space between the wing and the control surface, the seal comprising a seal base configured to couple with one of the wing and the control surface so as to form a respective seal with the one of the wing and the control surface, a resilient lattice body coupled to the seal base, and a cover comprising an inner surface coupled to the resilient lattice body in an opposing relationship relative to the seal base so that the cover moves towards and away from the seal base in a biasing direction of the resilient lattice body, and a bulbous outer surface configured to engage another of the wing and the control surface so as to form a respective seal with the other of the wing and the control surface.

Still another example of the subject matter according to the present disclosure relates to a method of forming a seal, the method comprising: additively manufacturing a seal base that is configured to couple with a first structure so as to form a respective seal with the first structure; additively manufacturing a resilient lattice body onto the seal base; and additively manufacturing a cover onto the resilient lattice body where the cover comprises an inner surface coupled to the resilient lattice body in an opposing relationship relative to the seal base so that the cover moves towards and away from the seal base in a biasing direction of the resilient lattice body, and a bulbous outer surface configured to engage a second structure disposed adjacent the first structure so as to form a respective seal with the second structure, and so that a space that exists between the first structure and the second structure is sealed by the seal.

Yet another example of the subject matter according to the present disclosure relates to a method of using a seal to seal a space between a first structure and a second structure that is movable relative to the first structure, the method comprising: engaging both the first structure and the second structure with the seal so as to seal the space with the second structure in a first position relative to the first structure, where the seal comprises a seal base configured to couple with one of the wing and the control surface so as to form a respective seal with the one of the wing and the control surface, a resilient lattice body coupled to the seal base, and a cover comprising an inner surface coupled to the resilient lattice body in an opposing relationship relative to the seal base so that the cover moves towards and away from the seal base in a biasing direction of the resilient lattice body, and a bulbous outer surface configured to engage another of the wing and the control surface so as to form a respective seal with the other of the wing and the control surface; and disengaging the second structure from at least a portion of the seal with the second structure in a second position relative to the first structure so that at least a portion of the space is unsealed; wherein second structure swipes across the seal moving between the first position and the second position.

BRIEF DESCRIPTION OF THE DRAWINGS

Figure 1:
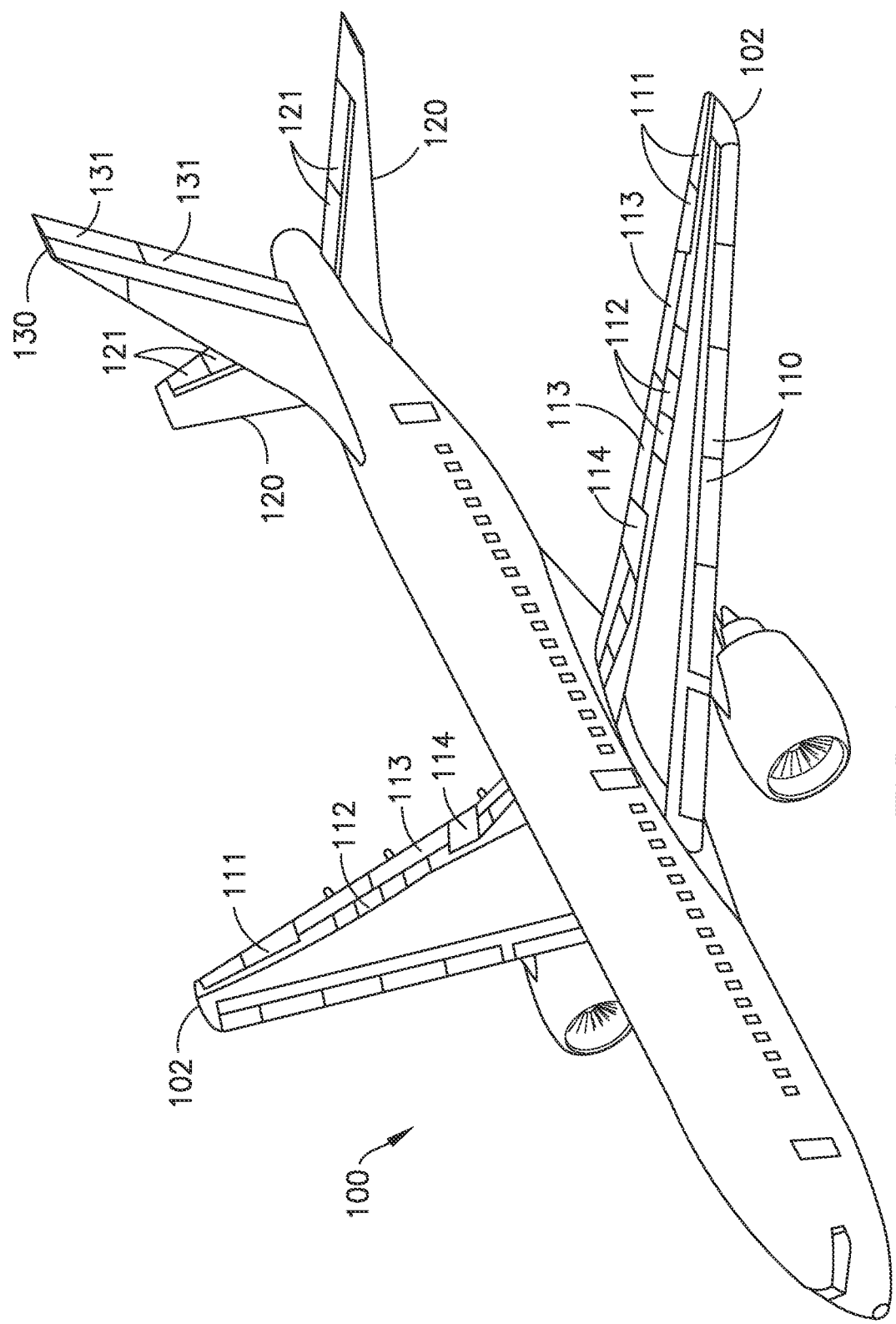
Figure 2A:
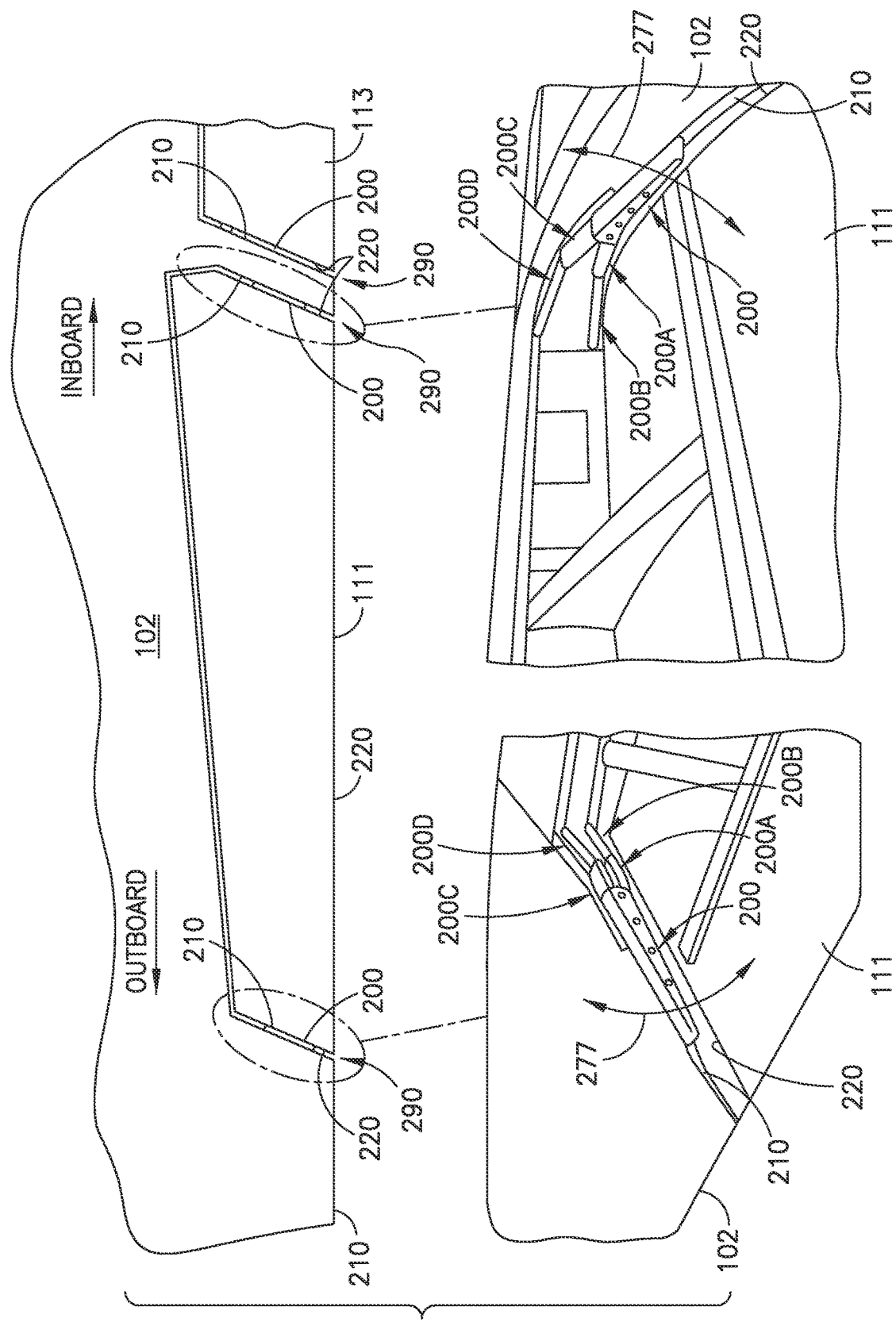
Figure 2B:
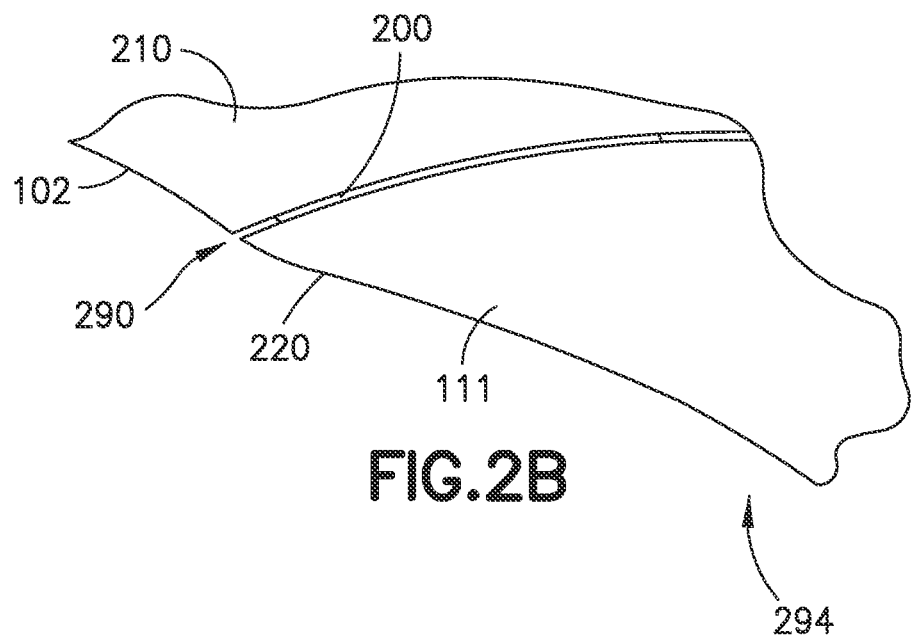
Figure 2C:
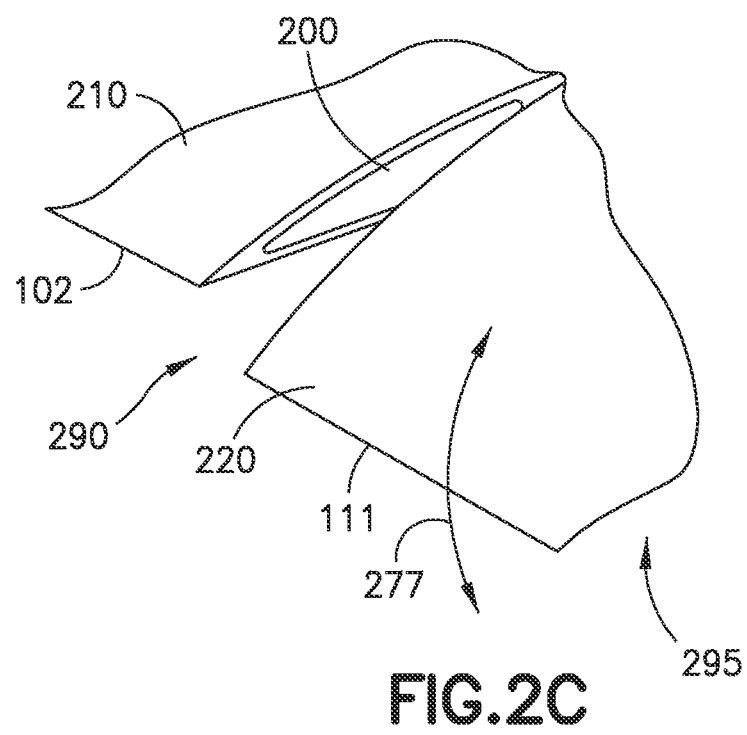
Figure 3A:
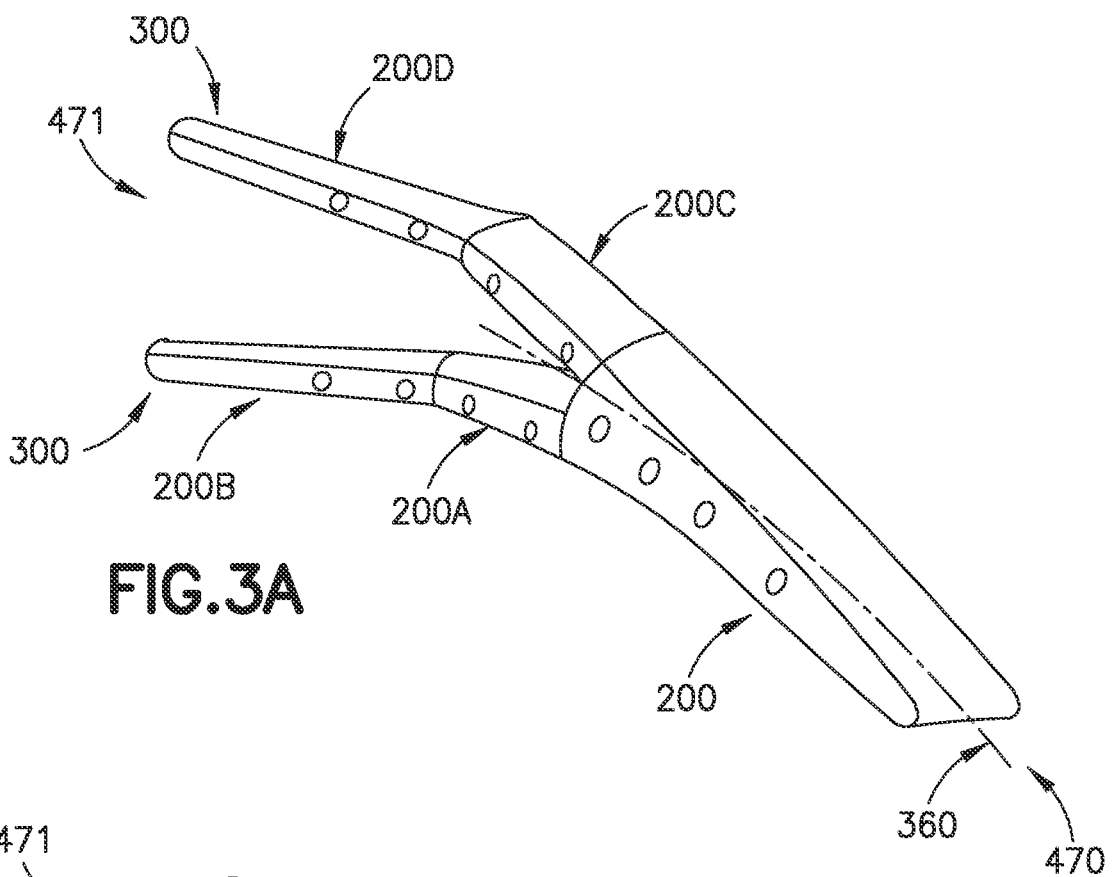
Figure 3B:
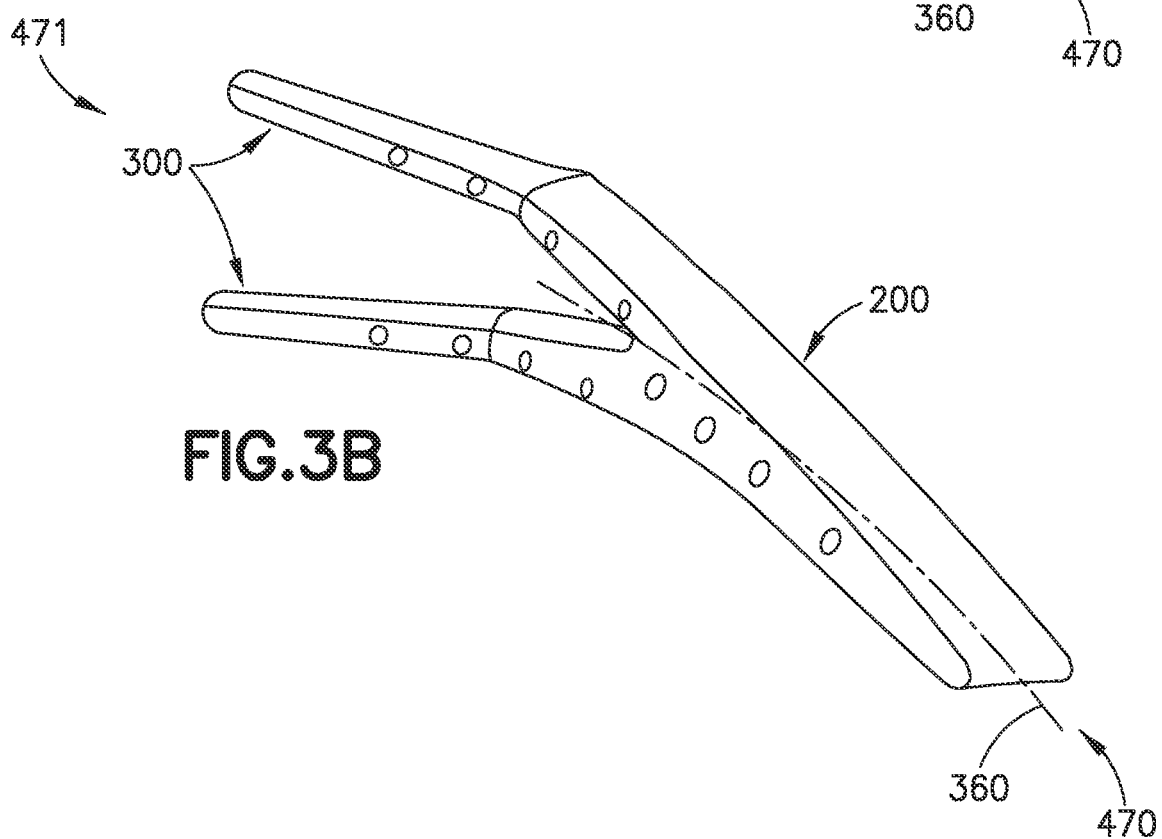
Figure 4A:
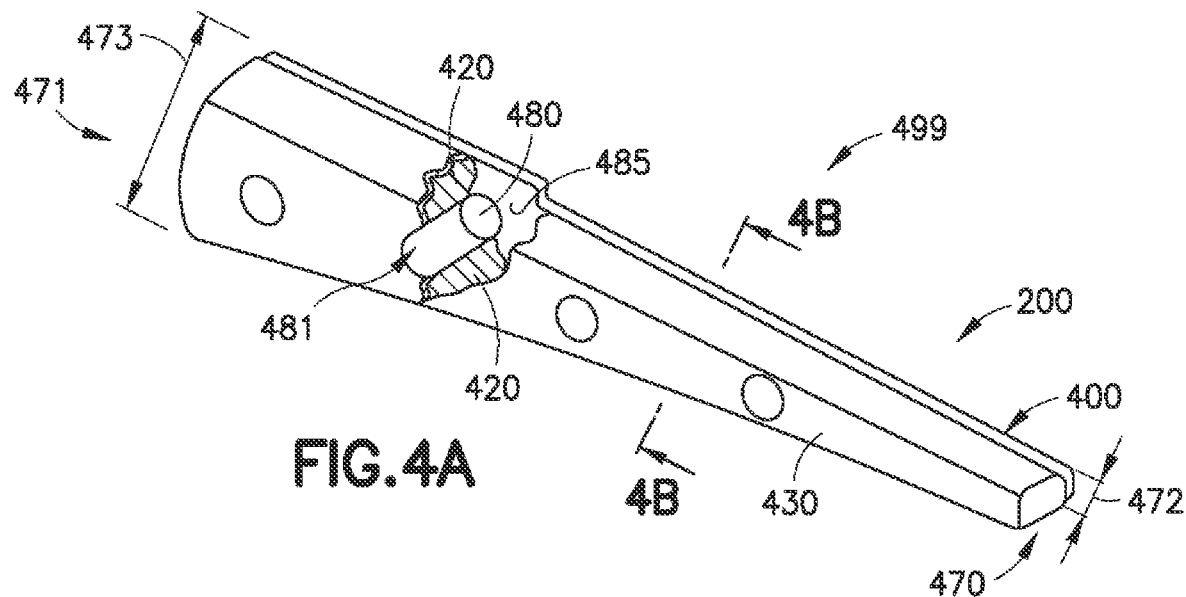
Figure 4B:
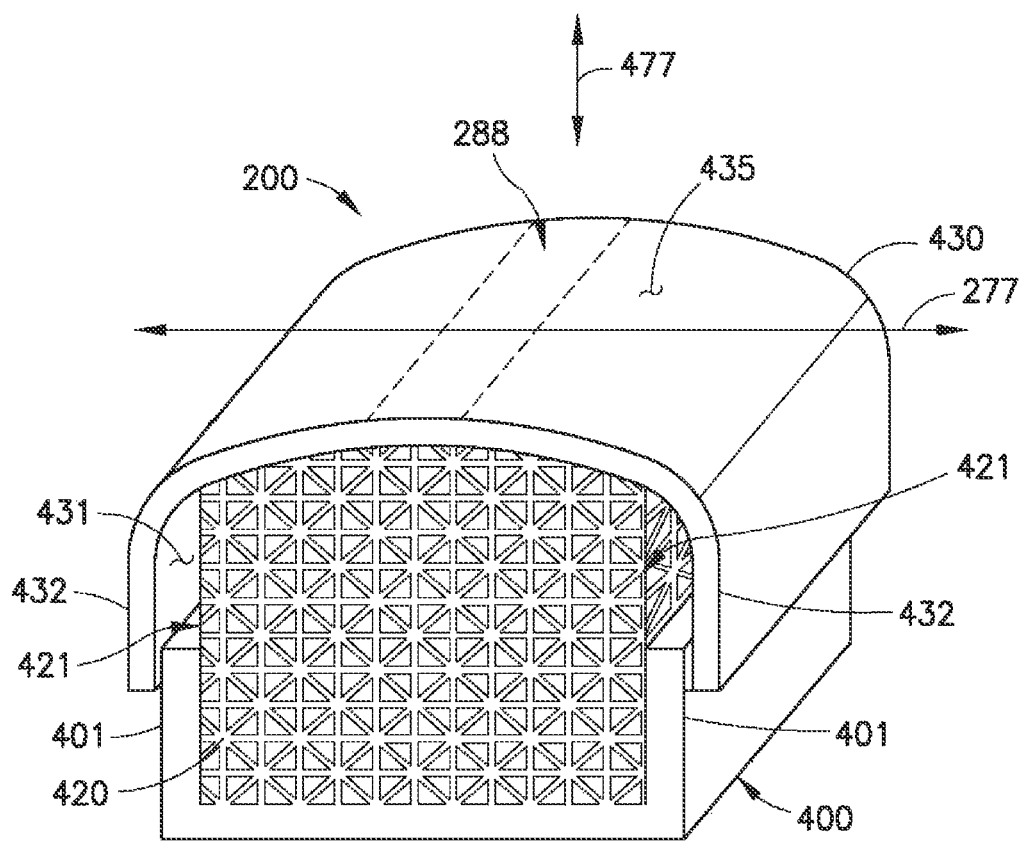
Figure 4C:
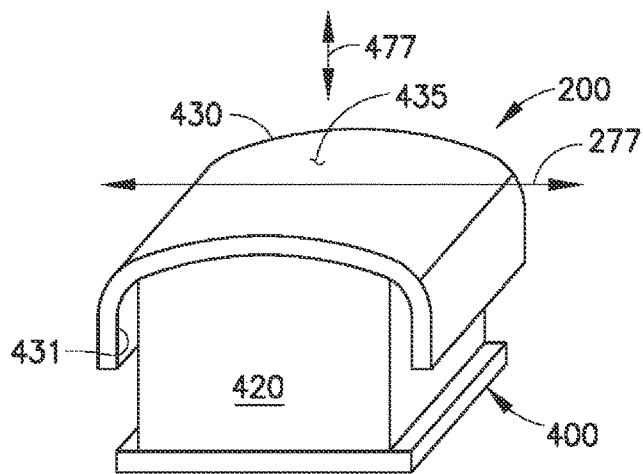
Figure 4D:
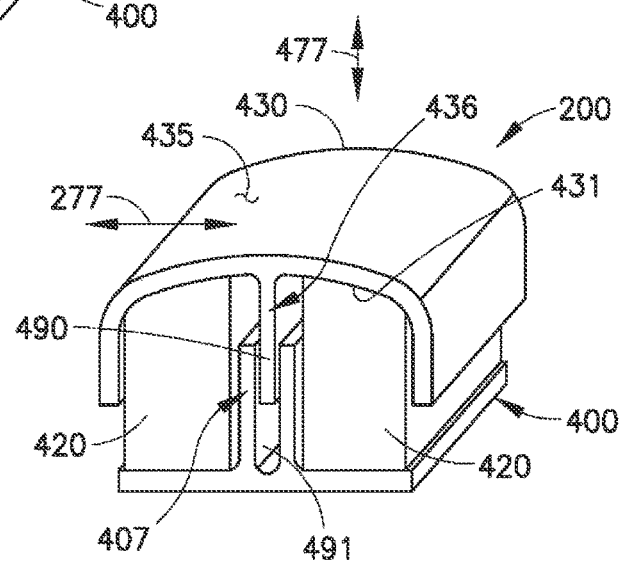
Figure 4E:
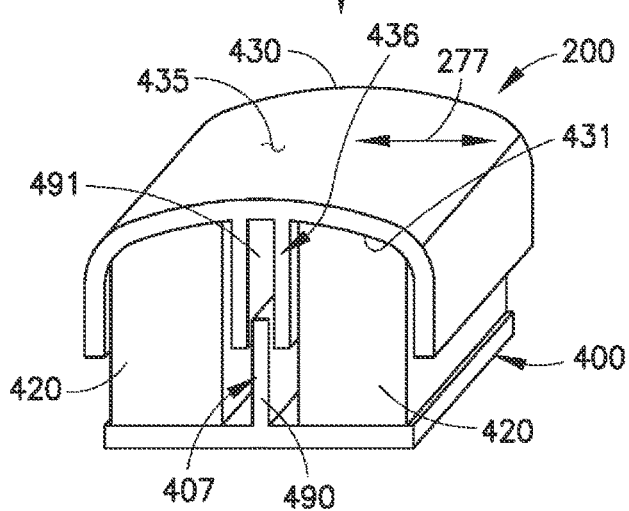
Figure 4F:
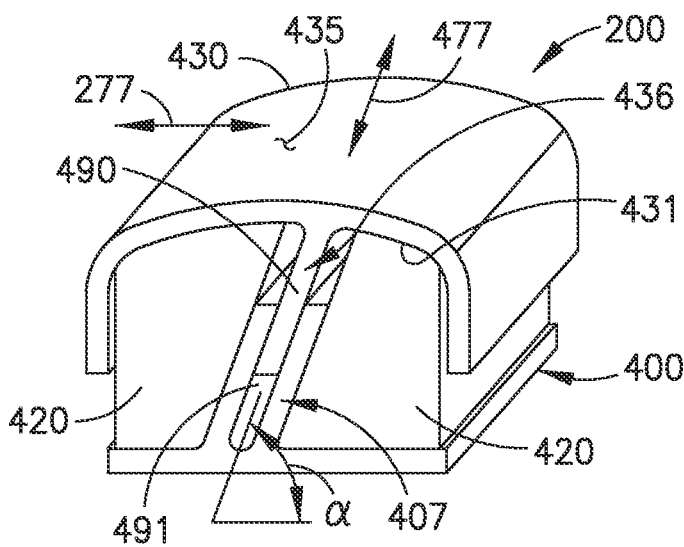
Figure 4G:
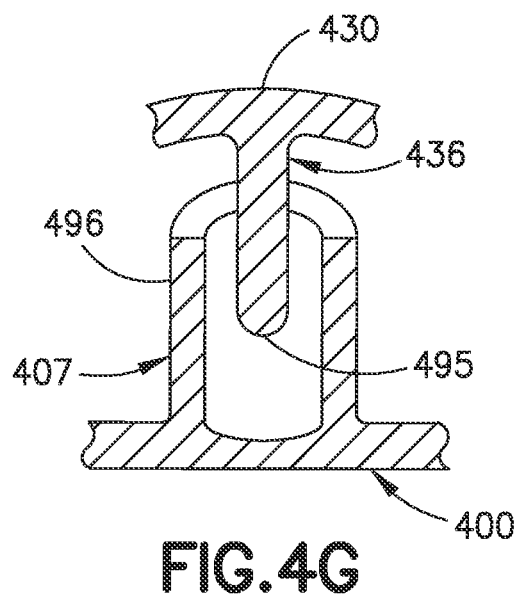
Figure 4H:
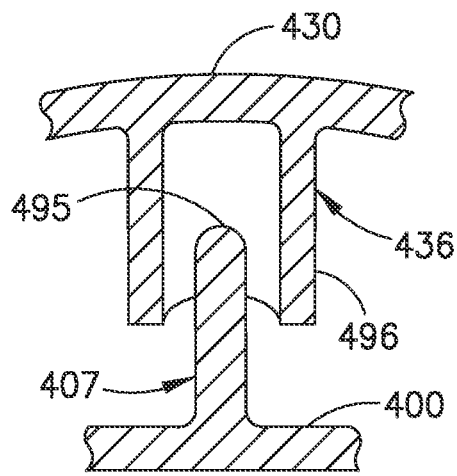
Figure 5:
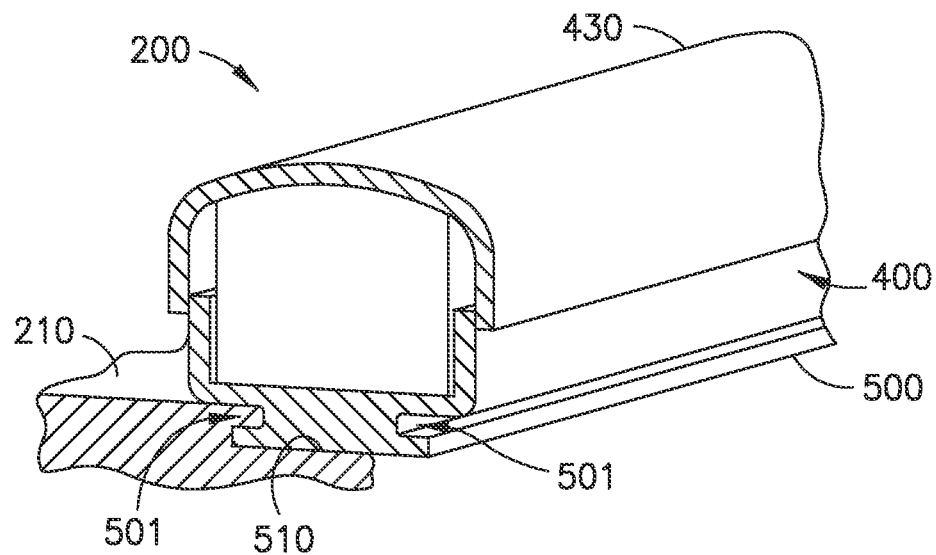
Figure 6:
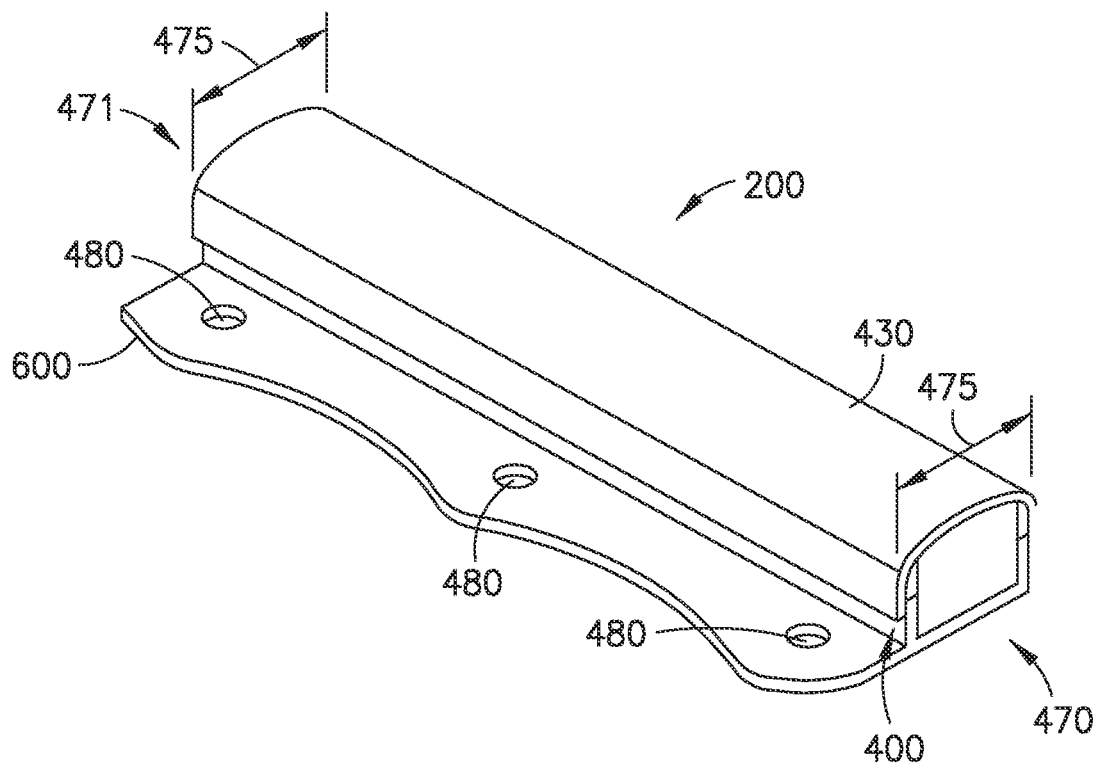
Figure 7:
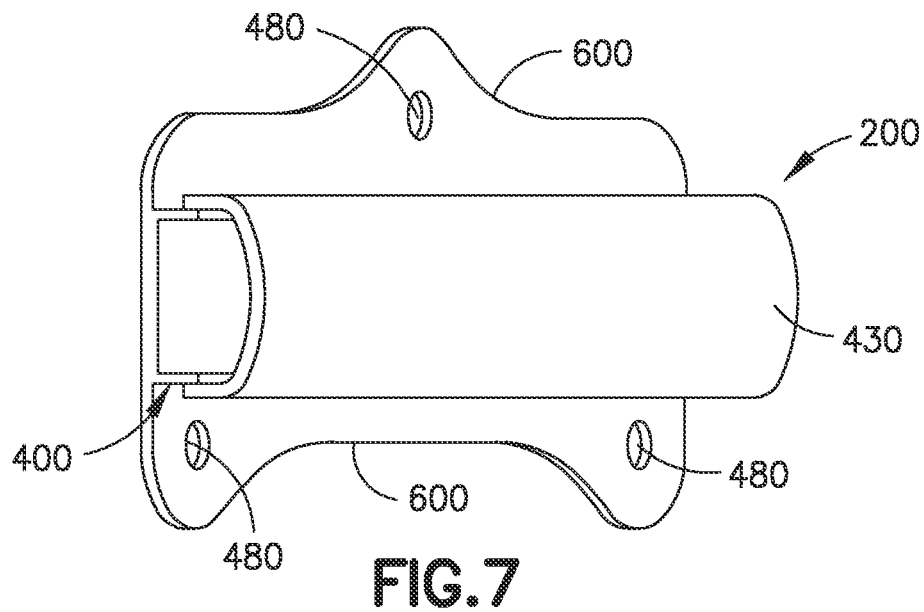
Figures 8A, 8B:
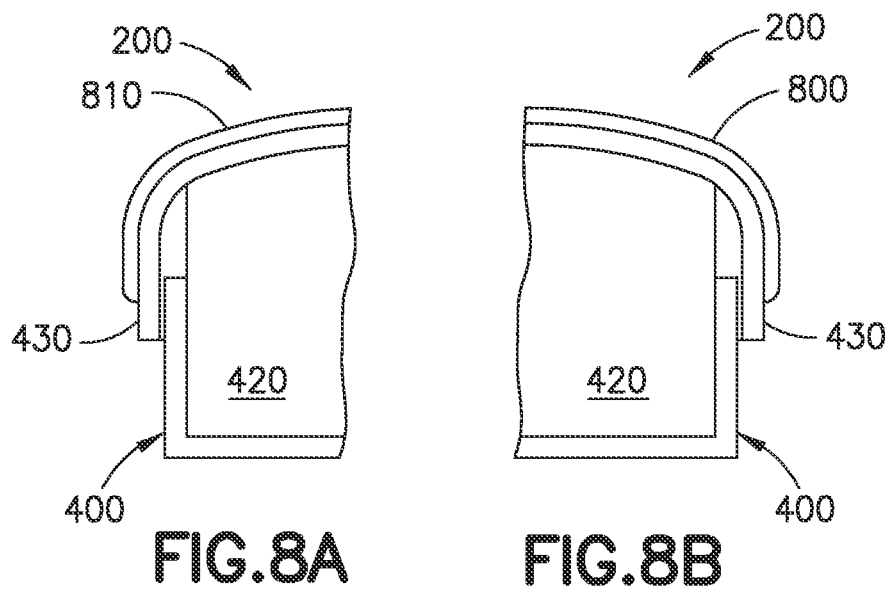
Figure 9D:
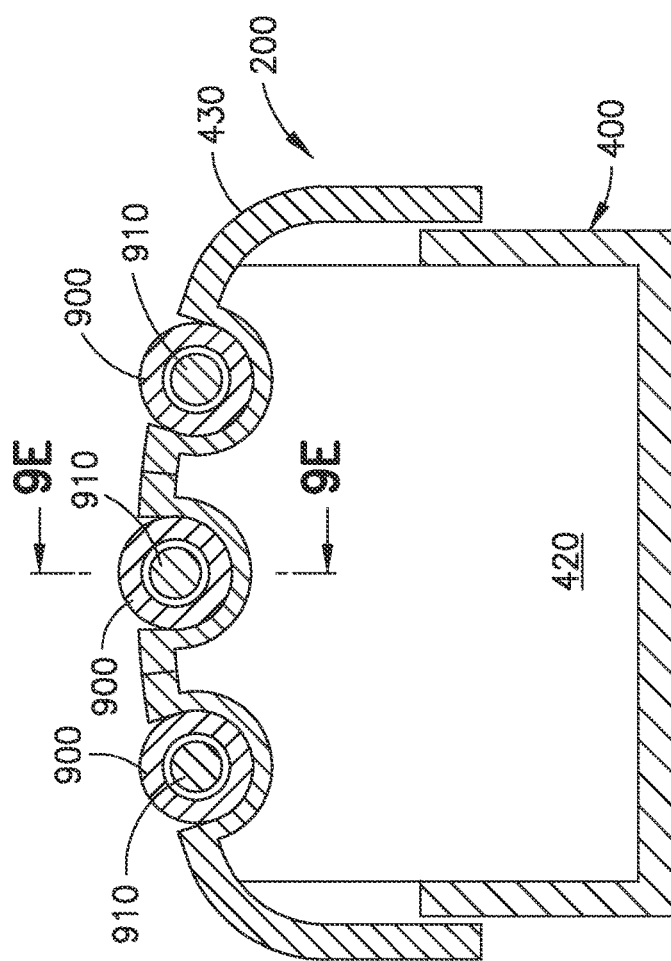
Figure 9C:
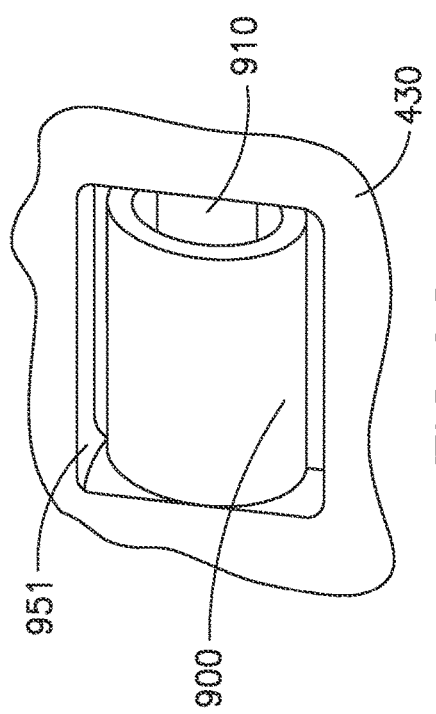
Figure 9E:
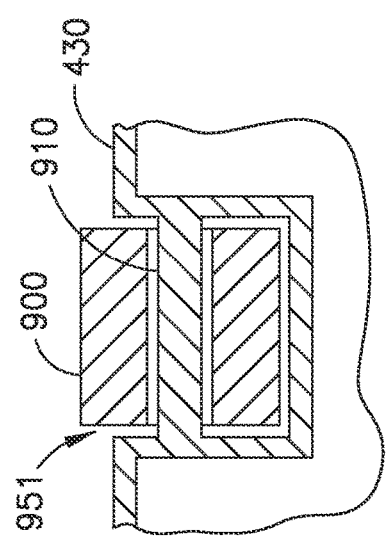
Figure 10A:
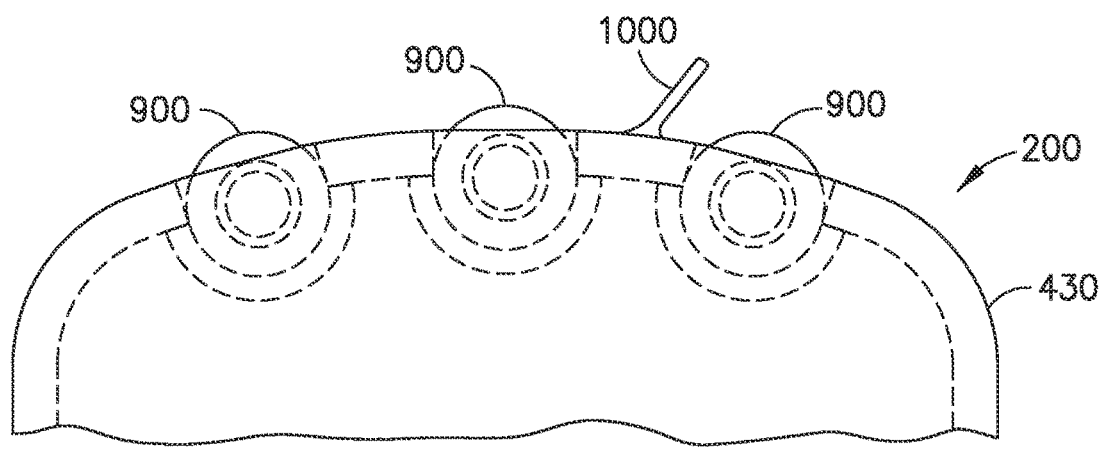
Figure 10B:
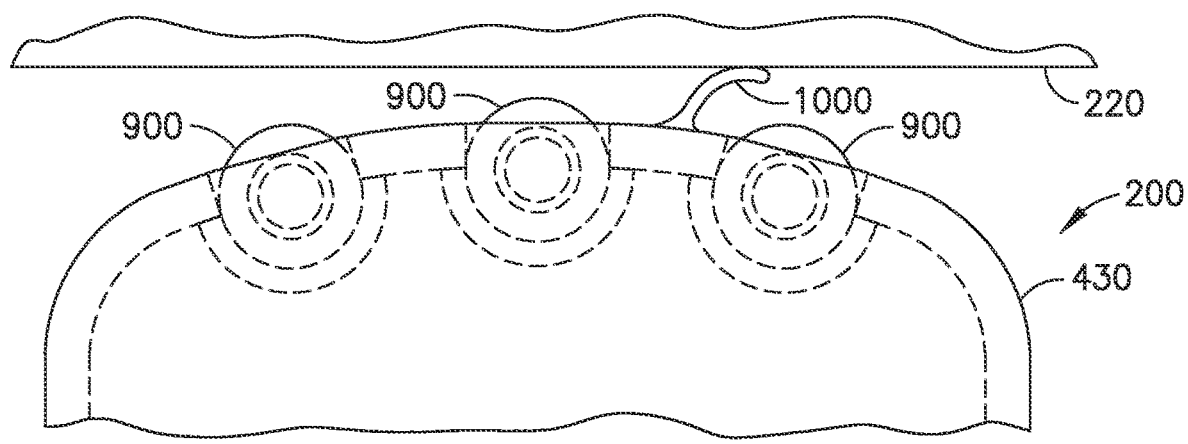
Figure 11:
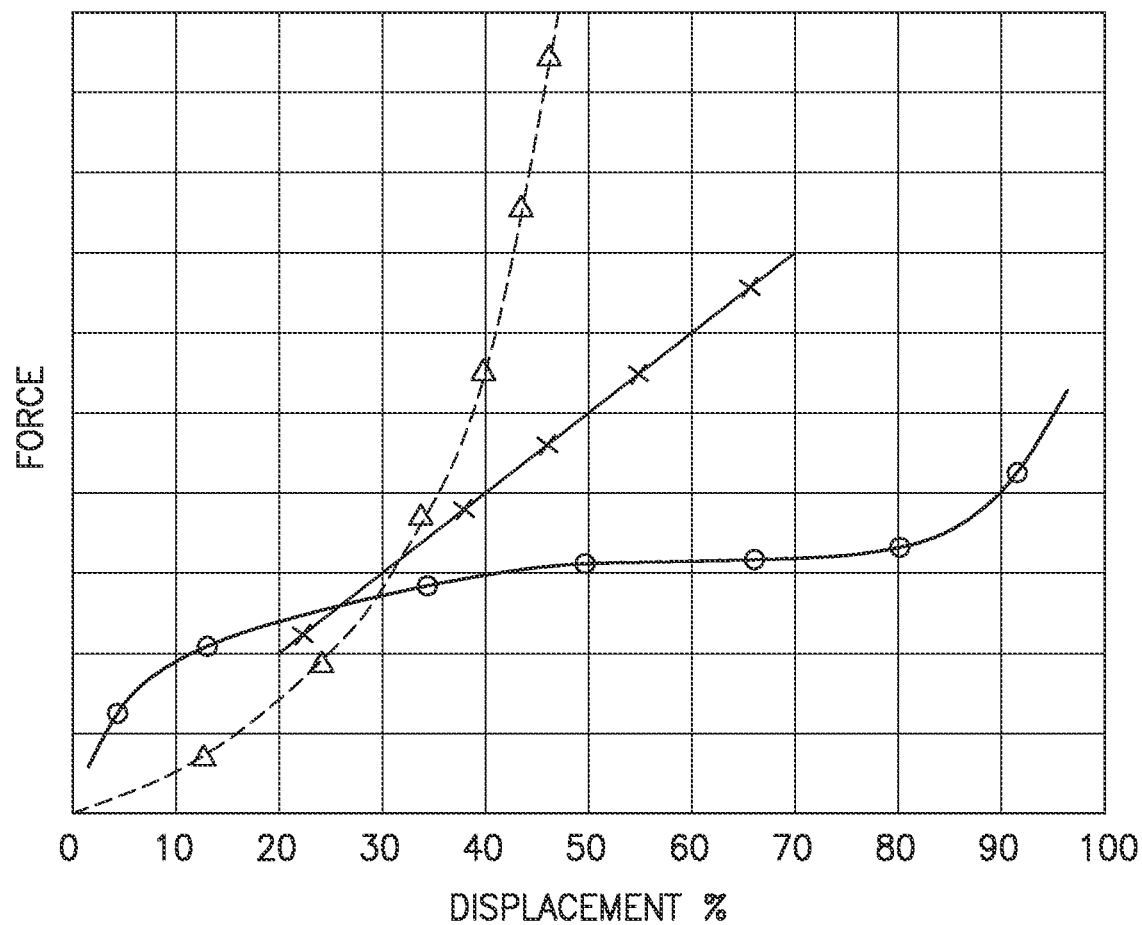
Figure 12:
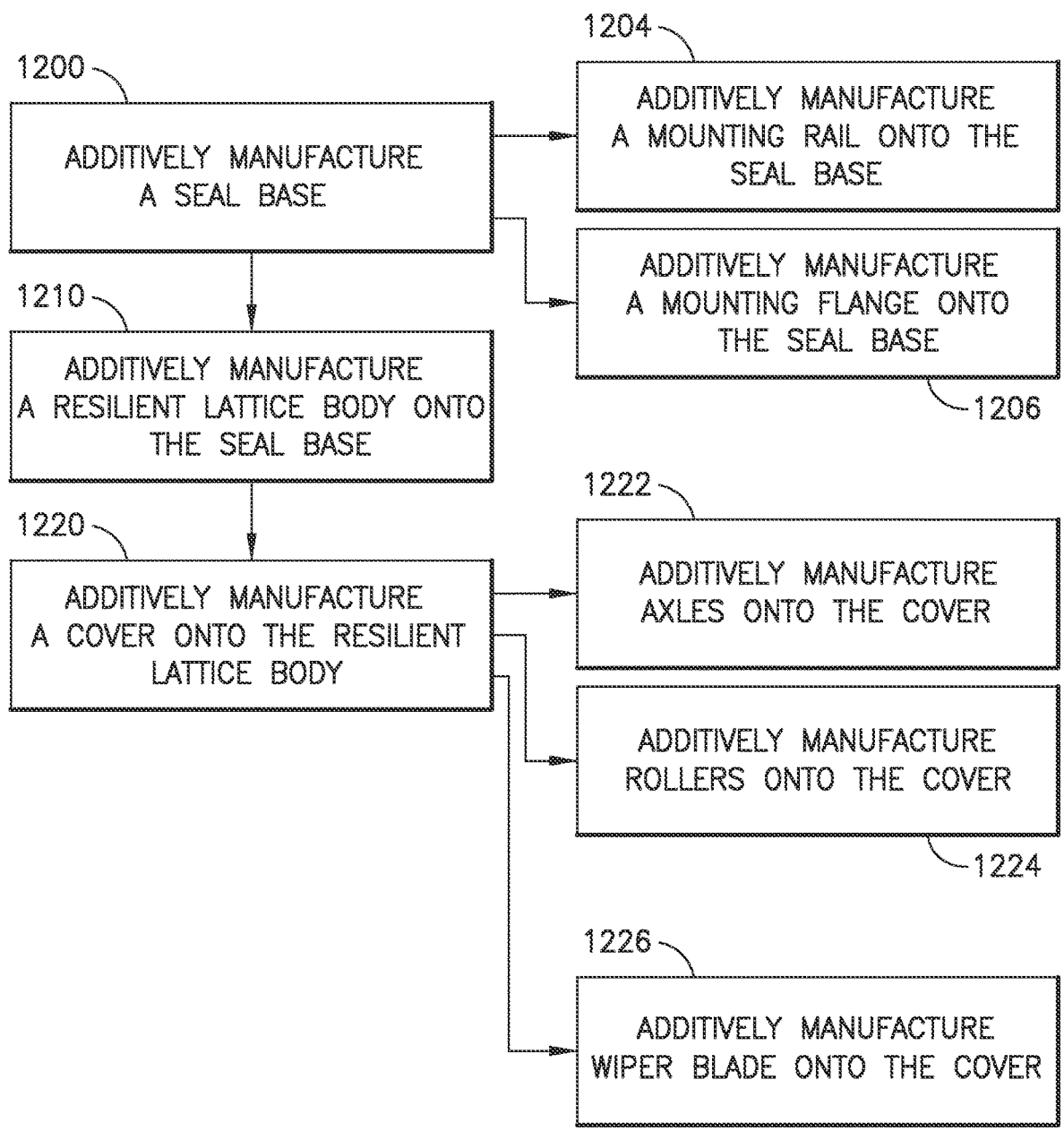
Figure 13:
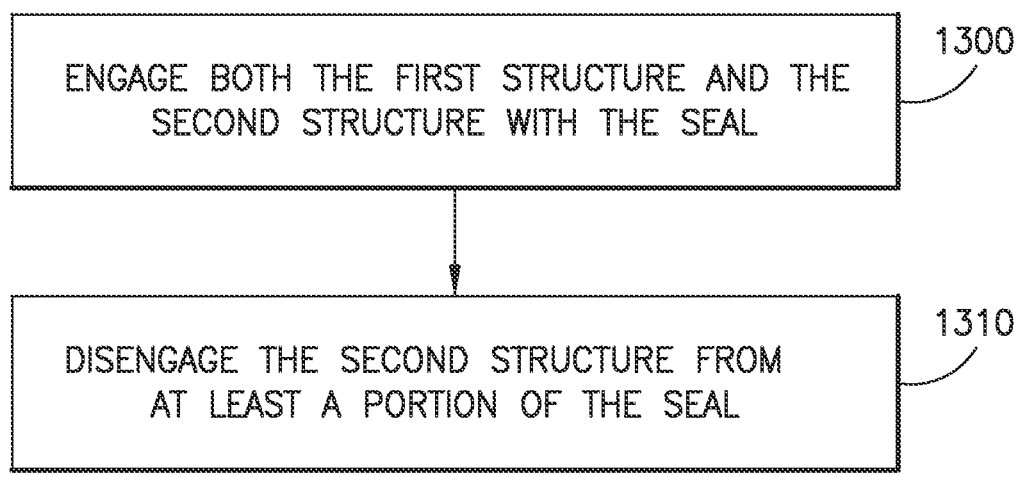

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a schematic perspective illustration of an aircraft including aspects of the present disclosure;

FIGS. 2A-2C are schematic illustrations of a portion of the aircraft of FIG. 1 and seals according to the present disclosure;

FIG. 3A is a schematic perspective illustration of seals in accordance with the disclosure;

FIG. 3B is a schematic perspective illustration of a seal in accordance with the present disclosure;

FIG. 4A is a schematic perspective illustration of a seal in accordance with the present disclosure;

FIG. 4B is a cross-sectional illustration of a portion of the seal of FIG. 4A in accordance with the present disclosure;

FIG. 4C is a cross-sectional illustration of a portion of the seal of FIG. 4A in accordance with the present disclosure;

FIG. 4D is a cross-sectional illustration of a portion of the seal of FIG. 4A in accordance with the present disclosure;

FIG. 4E is a cross-sectional illustration of a portion of the seal of FIG. 4A in accordance with the present disclosure;

FIG. 4F is a cross-sectional illustration of a portion of the seal of FIG. 4A in accordance with the present disclosure;

FIG. 4G is a cross-sectional illustration of a portion of the seal of FIG. 4A in accordance with the present disclosure;

FIG. 4H is a cross-sectional illustration of a portion of the seal of FIG. 4A in accordance with the present disclosure;

FIG. 5 is a cross-sectional perspective illustration of a portion of the seal of FIG. 4A in accordance with the present disclosure;

FIG. 6 is a perspective illustration of a seal in accordance with the present disclosure;

FIG. 7 is a perspective illustration of a seal in accordance with the present disclosure;

FIGS. 8A and 8B are partial front views of a seal in accordance with aspects of the present disclosure;

FIG. 9A is a perspective illustration of a seal in accordance with the present disclosure;

FIG. 9B is a perspective illustration of a portion of the seal of FIG. 9A in accordance with the present disclosure;

FIG. 9C is a perspective illustration of a portion of the seal of FIG. 9A in accordance with the present disclosure;

FIG. 9D is a cross-sectional illustration of a portion of the seal of FIG. 9A in accordance with the present disclosure;

FIG. 9E is a cross-sectional illustration of a portion of the seal of FIG. 9A in accordance with the present disclosure;

FIGS. 10A and 10B are front views of a portion of the seal of FIG. 9A in accordance with the present disclosure;

FIG. 11 is an exemplary chart illustrating force-displacement curves for various seal types including the seals in the above-mentioned Figs. in accordance with the present disclosure;

FIG. 12 is a flow diagram for an exemplary method in accordance with the present disclosure; and FIG. 13 is a flow diagram for an exemplary method in accordance with the present disclosure.

DETAILED DESCRIPTION

Aspects of the present disclosure provide for seals that are placed between two surfaces, where at least one of the two surfaces moves relative to the other of the two surfaces in a swiping motion. The seals of the present disclosure are additively manufactured as monolithic members which may reduce part count, weight and costs associated with assembly and manufacture of the seals. The monolithic construction of the seal and/or the materials from which the seal is constructed may provide rigidity to the seal so that the seal can be mounted or otherwise coupled to a surface with reduced materials (e.g., such as a fastener passing through a portion of the seal). The seals of the present disclosure may also be additively manufactured so as to have non-uniform geometries (i.e., custom geometries) without the use of molds. The seals of the present disclosure may provide for optimal/increased aerodynamic performance, reduced noise, flame resistance, and/or increased drainage of fluid accumulation between the two surfaces.

Referring to FIGS. 1 and 2A, an aircraft 100 is illustrated and includes seals 200 in accordance with the present disclosure. While the present disclosure will be described with respect to the aircraft 100 it should be understood that the seals 200 of the present disclosure may be used in any suitable industry/application including, but not limited to, the automotive, maritime, aeronautic, space, submersible, and electrical power generation industries. As can be seen in FIG. 1, the aircraft 100 includes one or more wings. The term wing is used herein generally to refer to any one or more of a main wing 102, a horizontal stabilizer 120, and a vertical stabilizer 130. The main wing 102 includes control surfaces coupled to the main wing 102 where the control surfaces of the main wing 102 include one or more of slats 110, ailerons 111, spoilers 112, flaps 113, and flaperons 114. The horizontal stabilizer 120 includes control surfaces coupled to the horizontal stabilizer 120 where the control surfaces of the horizontal stabilizer 120 include one or more elevators 121. The vertical stabilizer 130 includes control surfaces coupled to the vertical stabilizer 130 where the control surfaces of the vertical stabilizer include one or more rudders 131.

Referring to FIGS. 1 and 2A, seals 200 are disposed between a first structure 210 (e.g., such as one of the wing and the control surface) and a second structure 220 (e.g., such as another of the wing and the control surface) so as to aerodynamically seal a space 290 between the first structure 210 and the second structure 220. FIG. 2A illustrates seals 200 (i.e., aileron wedge seals) located between the main wing 102 and each of the inboard and outboard end of an aileron 111 coupled to the main wing 102 where each seal 200 forms a seal between the main wing 102 and the aileron 111. FIG. 2A, illustrates a seal 200 located between the main wing 102 and each of the outboard and inboard ends of the aileron 111 where the upper skin of the aileron 111 is removed in the detail portions of FIG. 2A for illustration of the seals 200. In other aspects, the seals 200 may be disposed to seal a space 290 between the main wing 102 and a slat 110, the main wing 102 and a flap 113, the main wing 102 and a spoiler 112, the vertical stabilizer 130 and a rudder 131, the horizontal stabilizer 120 and an elevator 121, two adjacent slats 110, two adjacent flaps 113, two adjacent ailerons 111, a flap 113 and adjacent flaperon 114, two adjacent spoilers 112, two adjacent rudders 131, and/or two adjacent elevators 121 in a manner substantially similar to that illustrated in FIG. 2A. In still other aspects, the seals 200 may be employed to aerodynamically seal any suitable portion of the aircraft 100, such as with respect to the landing gear doors, cabin doors, and cargo doors, and wing to body fairing.

Referring to FIGS. 2A, 3A, 3B, and 4A, the seal 200 has a longitudinally elongated configuration having a first end 470 and a second end 471. In one aspect, a longitudinal axis 360 of the seal 200 follows an arcuate path, while in other aspects the longitudinal axis may follow any suitable path such as a straight line path and/or a serpentine path. The first end 470 has a lateral width 472 that is less than another lateral width 473 of the second end 471 so as to form a wedge shaped seal. In other aspects the first end 470 and the second end 471 of the seal 200 may have the same lateral width 475 (see FIG. 6). The lateral width 475 may be constant (i.e., the same) along the length of the seal, while in other aspects the width may increase and/or decrease relative to the lateral width 475 (i.e., at the first end 470 and the second end 471) between the first end 470 and the second end 471.

To seal the space 290 one or more seals may be employed. For example, individual seals 200A and 200B may form one seal extension that abuts the second end 471 of seal 200 (see FIG. 3A). Individual seals 200C and 200D may form another seal extension that abuts the second end 471 of seal 200 (see FIG. 3A). The seals 200A-200D may be substantially similar in their construction/configuration to seal 200, such that the following description of seal 200 applies to seals 200A-200D. Referring to FIG. 3B, the seal extensions 300 may be integrally formed with the seal 200 as a monolithic member such that the seal extensions 300 extend from the second end 471 of the seal 200. The seal extensions 300 extend from the second end 471 so as to diverge from one another and follow the upper and lower skin surfaces of the wing and/or control surfaces so as to aerodynamically seal the space 290 between the wing and the control surface or the space between adjacent control surfaces. In other aspects the seal extensions 300 may have any suitable shape that conforms with a shape (e.g., cross sectional profile) of the wing and/or control surfaces.

Referring to FIGS. 4A, 4B and 4C, the seal 200 includes a seal base 400, a resilient lattice body 420, and a cover 430. The seal base 400 is configured to (e.g., is sized and shaped and through suitable mechanical and/or chemical fasteners) couple with the first structure 210 so as to form a respective seal with the first structure 210 (i.e., substantial contact exists along a length of the seal 200 so as to substantially prevent passage of air between the seal 200 and the first structure). The resilient lattice body 420 is coupled to the seal base 400. The cover 430 comprises an inner surface 431 and a bulbous outer surface 435. The inner surface 431 is coupled to the resilient lattice body 420 in an opposing relationship relative to the seal base 400 so that the cover 430 moves towards and away from the seal base 400 in a biasing direction (see direction 477 in FIGS. 4B-4F) of the resilient lattice body 420. The cover 430 may have a range of movement (i.e., the seal 200 may be compressed) in the biasing direction between about 0.25 inches (about 6 mm) and about 0.40 inches (about 10 mm); while in other aspects the range of movement may be less than about 0.25 (about 6 mm) inches or greater than about 0.40 inches (about 10 mm). The resilient lattice body 420 comprises a lattice structure (an example of which is illustrated in FIG. 4B) that is coupled to both the seal base 400 and the inner surface 431 of the cover 430. The resilient lattice body 420 is configured to compress in response to a force applied to cover 430 (and/or a force applied to the seal base 400). The resilient lattice body 420 includes a plurality of supports defining a plurality of interstitial voids between the plurality of supports. A biasing force provided by the resilient lattice body 420 may be more uniform over the displacement (e.g., compression amount) of the seal 200 compared to conventional bulb seals or metal spring seals (as shown in FIG. 11).

The bulbous outer surface 435 is configured to engage the second structure 220 so as to form a respective seal with the second structure 220 (i.e., substantial contact exists along a length of the seal 200 so as to substantially prevent passage of air between the seal 200 and the second structure 220). The bulbous outer surface 435 has a contour that is configured to substantially prevent a dragging movement of the cover 430 as the second structure 220 moves relative to the first structure 210 in a swiping motion (see direction 277 in FIGS. 2A and 4B-4F) transverse to the biasing direction. For example, the bulbous outer surface 435 has a convex shape along the swiping direction, with a peak of the convex shape facing the second structure 220, so that the convex shape forms a ramped or arcuate surface along which the second structure 220 slides when moved in the swiping direction. The convex shape of the bulbous outer surface 435 provides a predetermined sealing patch 288 (see FIG. 4B), at least a portion of which forms the seal with (e.g., so as to contact and be biased against) the second structure 220, while areas of the bulbous outer surface 435 laterally adjacent the sealing patch 288 form transition or guide areas along which the movement of the second structure 220 gradually transitions into contact with the sealing patch (e.g., the transition areas provide for pivoting movement of the cover 430 (see FIGS. 4B and 4C) in reaction to the swiping motion of the second structure 220).

In one aspect, the seal 200 includes guides (see FIGS. 4B and 4D-4F) that define the biasing direction (i.e., movement of the cover 430 is a guided movement); while in other aspects (see FIG. 4C) the biasing direction is unguided (i.e., movement of the cover 430 is an unguided movement) and generally defined by the resilient lattice body 420 itself so that limited lateral movement of the cover 430 is provided in the swiping direction. Referring to FIG. 4B, the resilient lattice body 420 comprises lateral sides 421, the seal base 400 comprises base sides 401 that extend along the lateral sides 421, and the cover 430 comprises cover sides 432 that extend along the lateral sides 421 so that movement of the cover 430 in the biasing direction is guided by the base sides 401 and lateral sides 421.

Referring to FIGS. 4D, 4E, and 4F, the seal base 400 comprises a guiding protrusion 407 that extends at least partially through the resilient lattice body 420 towards the cover 430. The inner surface 431 of the cover 430 comprises a mating guiding protrusion 436 that extends at least partially through the resilient lattice body 420 towards the seal base 400, the mating guiding protrusion 436 being configured to mate with the guiding protrusion 407 so as to guide movement of the cover 430 in the biasing direction. In one aspect, the guiding protrusion 407 and the mating guiding protrusion 436 are substantially perpendicular to the seal base 400 (FIGS. 4D and 4E); while in other aspects, the guiding protrusion 407 and the mating guiding protrusion 436 are angled relative to the seal base 400 (FIG. 4F) by angle α. The angle α may be any suitable angle greater than about 20° and less than about 160°.

The guiding protrusion 407 and mating guiding protrusion 436 extend through the resilient lattice body 420 where a running clearance is provided between the resilient lattice body 420 and each of the guiding protrusion 407 and mating guiding protrusion 436 so as to provide unhindered relative movement between the guiding protrusion 407 and mating guiding protrusion 436. In one aspect, one of the guiding protrusion 407 and the mating guiding protrusion 436 comprises a rib 490 and another of the guiding protrusion 407 and the mating guiding protrusion 436 comprises a channel 491 configured to receive the rib 490 (FIGS. 4D-4F); while in another aspect, one of the guiding protrusion 407 and the mating guiding protrusion 436 comprises a post 495 and another of the guiding protrusion 407 and the mating guiding protrusion 436 comprises a stanchion 496 having a recess configured to receive the post 495 (FIGS. 4G and 4H).

Referring to FIGS. 4A and 5-7, a seal mounting structure is provided on the seal 200 to facilitate the mounting or coupling of the seal 200 to the first structure 210. Referring to FIG. 5, the seal base 400 comprises a mounting rail 500 extending from a side of the seal base 400 opposite the resilient lattice body 420. The mounting rail 500 comprises at least one channel 501 configured to mate with a mating channel 510 of the first structure 210. The mounting rail 500 is illustrated in FIG. 5 as a "T" shaped rail however, in other aspects the mounting rail 500 and the mating channel 510 may have any suitable shape such as a dovetail shape. Referring to FIGS. 6 and 7, the seal base 400 comprises a mounting flange 600 extending from the seal base 400, in a plane of the seal base 400. The mounting flange 600 may extend from a single lateral side of the seal base 400 as shown in FIG. 6 or from both lateral sides of the seal base 400 as shown in FIG. 7. The mounting flange 600 includes fastener apertures 480 through which any suitable fastener (e.g., bolt, screw, etc.) is inserted to couple the seal 200 to the first structure 210. In other aspects, the mounting flange 600 may extend from the seal base 400 in any suitable direction that may depend on a contour of the surface to which the seal is mounted. Referring to FIG. 4A, the seal base 400 comprises a fastener aperture 480 and a fastener seating surface 485 surrounding the fastener aperture 480. The cover 430 and the resilient lattice body 420 form a fastener pass-through 481 (i.e., an aperture) aligned with the fastener aperture 480, where any suitable fastener (e.g., bolt, screw, etc.) is inserted into the fastener pass-through 481 and through the fastener aperture 480. The fastener head rests on the fastener seating surface 485 while the body of the fastener is, e.g., threaded into the first structure for coupling the seal 200 to the first structure 210.

In accordance with the aspects of the present disclosure, the seal base 400 (inclusive of the seal mounting structure), the resilient lattice body 420, and the cover 430 are additively manufactured as a monolithic structure 499 such as by selective laser sintering (SLS) or other suitable additive manufacturing process that may be employed to "print" or otherwise form the seal 200. Where the seal extensions 300 are monolithically formed with the seal 200, the seal extensions 300 are formed by the seal base 400, the resilient lattice body 420 and the cover 430. The seal base 400, the resilient lattice body 420, and the cover 430 of the seal 200 may be additively manufactured from any suitable material including, but not limited to, metals (e.g., aluminum, titanium, steel, etc.), polymers (e.g., nylon, acetal homopolymer resin, polyetherketoneketone, polyether ether ketone, etc.), and elastomers (e.g., Buna-N, ethylene propylene diene monomer, neoprene, silicone, fluoroelastomers, etc.) or any combination thereof. The cover 430 may be formed so as to be pliable so at least a portion of the cover 430 bends and flexes when a force is applied to the cover 430. For example, the convex shape the cover 430 may deform to at least partially conform to a shape of the second structure 220 while still maintaining the laterally adjacent transition areas (see, e.g., FIG. 4B). In other aspects the cover 430 may be rigid so as to not deform when a force is applied to the cover 430. Additively manufacturing the seal 200 from a metal may also provide fire/heat resistance to the seal 200.

Referring to FIGS. 8A and 8B, the cover 430 of the seal 200 may be provided with any suitable friction reducing material that reduces frictional forces between the cover 430 and the second structure 220 as the second structure 220 moves across the cover 430 in the swiping direction. Referring to FIG. 8A a sailcloth layer 810 is coupled to the bulbous outer surface 435 of the cover 430 in any suitable manner (such as with chemical and/or mechanical fasteners). Referring to FIG. 8B, any suitable friction reducing coating 800 (e.g., such as polytetrafluoroethylene) is deposited or is otherwise applied to the bulbous outer surface 435 in any suitable manner.

Referring also to FIGS. 9A-9E friction between the cover 430 and the second structure 220 may be reduced by rollers 900, or any other suitable bearing structure, configured to engage the second structure 220. The bulbous outer surface 435 of the cover 430 comprises rollers 900 configured to movably engage the second structure 220 (i.e., the rollers rotate about their axles in response to movement of the second structure 220 in the swiping direction across the cover 430). The cover 430 is additively manufactured with the rollers 900 so that the rollers 900 are captured by the cover 430 by additively manufactured axles 910 of the cover 430. Each axle 910 extends through a respective roller 900. A plurality of recesses 951 are formed, e.g., during additive manufacturing of the seal 200, on the bulbous outer surface 435 of the cover 430. A roller 900 is captured, by the axle 910 located within the respective recess 951, at least partially within a respective recess 951 so as to protrude from the respective recess past the bulbous outer surface 435. In one aspect, each of the rollers 900 and axles 910 are additively manufactured in-situ with the cover 430 (see, e.g., FIG. 9C-9E). For example, selective laser sintering (SLS) or other suitable additive manufacturing process may be employed to "print" or otherwise form the seal 200 (inclusive of the rollers 900) so that a running clearance is provided between each of the rollers 900 and a respective axle 910 as the cover 430, the resilient lattice body 420, the seal base 400, and the rollers 900 are additively manufactured and are assembled by virtue of the additive manufacturing process. In this aspect, the rollers 900 may be formed of the same material as the seal 200.

In other aspects, each of the rollers 900 comprises a material that is different than the seal 200. For example, the seal 200 may be constructed of a polymer while the rollers 900 are constructed of a metal such as aluminum, titanium, steel, etc. In this aspect, the rollers 900 may be provided as inserts to the additive manufacturing process where the seal 200 is additively formed around the rollers 900. The term insert as used herein refers to an item that is placed on or suspended above the build table/platform of the additive manufacturing process so that the additively manufactured part may be built around, so as to integrate, the insert into the additively manufactured part. For example, in one aspect, referring to FIG. 9B, the roller 900 and axle 910 are provided as inserts where the cover 430 is additively manufactured around the axle 910 so that the axle 910 (and the roller 900) is retained within the recess 951. In still other aspects, the cover 430 may be formed with the recesses 951 and axle apertures 998 (see, e.g., exemplary axle aperture 998 in FIG. 9A) are provided through walls of the cover that form the recesses 951. The rollers 900 and axles 910 (FIG. 9B) may be provided as a kit of parts that form a roller assembly 999. Here the axle 910 may be common to a row of rollers 900 and is inserted through a respective axle aperture 998 along a length of the seal 200 and through each roller 900 (located within a respective aperture) in the row so as to capture the rollers 900 within the respective recesses 951. In other aspects, the additive manufacturing process may be configured to deposit different types of materials such that the cover 430 may be additively manufactured from one material while the rollers 900 and axles 910 are additively manufactured in-situ from another material different from the cover material.

Where the rollers 900 are employed, the seal 200 may include a wiper blade 1000 that aerodynamically seals any gaps or spaces, formed by the rollers 900, which may exist between the bulbous outer surface 435 and the second structure 220; while in other aspects the rollers 900 may be arranged to form a labyrinth seal to aerodynamically seal the space 290. Where the wiper blade 1000 is employed, the wiper blade 1000 extends from the bulbous outer surface 435. The wiper blade 1000 may be additively manufactured in-situ with the cover 430 so as to extend from the bulbous outer surface 435 or be affixed to the cover 430 in any suitable manner (e.g., mechanical or chemical fasteners). The wiper blade 1000 is configured to (e.g., shaped and sized) engage the second structure 220 so as to form a seal with the second structure 220. The wiper blade 1000 may be resilient and at least partially conform to a shape of the second structure as shown in FIG. 10B.

Referring to FIGS. 12 and 4A-4F, an exemplary method of forming the seal 200 includes additively manufacturing a seal base 400 (FIG. 12, Block 1200) that is configured to couple with a first structure 210 so as to form a respective seal with the first structure 210. In one aspect, base sides 401 are additively manufactured on the seal base 400 where the base sides 401 extend along the lateral sides 421 of the resilient lattice body 420. In one aspect, the guiding protrusion 407 is additively manufactured on the seal base 400 so that the guiding protrusion 407 extends at least partially through the resilient lattice body 420 towards the cover 430. The method for forming the seal 200 may further comprise additively manufacturing the mounting rail 500 on the seal base 400 (FIG. 12, Block 1204) where the mounting rail 500 extends from a side of the seal base 400 opposite the resilient lattice body 420. The method for forming the seal may further comprise additively manufacturing a mounting flange 600 on the seal base 400 (FIG. 12, Block 1206) where the mounting flange 600 extends from the seal base 400, in a plane of the seal base 400.

The method also includes additively manufacturing a resilient lattice body 420 onto the seal base 400 (FIG. 12, Block 1210). Here, the lateral sides 421 are additively manufactured on the resilient lattice body 420.

A cover 430 is additively manufactured onto the resilient lattice body 420 (FIG. 12, Block 1220) where the cover 430 comprises the inner surface 431 coupled to the resilient lattice body 420 in an opposing relationship relative to the seal base 400 so that the cover 430 moves towards and away from the seal base 400 in a biasing direction of the resilient lattice body 420, and a bulbous outer surface 435 configured to engage a second structure 220 disposed adjacent the first structure 210 so as to form a respective seal with the second structure 220, and so that a space that exists between the first structure 210 and the second structure 220 is sealed by the seal 200. The bulbous outer surface 435 is additively manufactured so as to have the contour that is configured to substantially prevent a dragging movement of the cover 430 as the second structure 220 moves relative to the first structure 210 in a swiping motion transverse to the biasing direction. Here cover sides 432 are additively manufactured on the cover 430 where the cover sides 432 extend along the lateral sides 421 so that movement of the cover 430 in the biasing direction is guided by the base sides 401 and lateral sides 421. The resilient lattice body 420, and the cover 430 are additively manufactured as a monolithic structure 499.

In one aspect, the mating guiding protrusion 436 is additively manufactured on the inner surface 431 of the cover 430 so that the mating guiding protrusion 436 extends at least partially through the resilient lattice body 420 towards the seal base 400, the mating guiding protrusion 436 being configured to mate with the guiding protrusion 407 so as to guide movement of the cover 430 in the biasing direction. In one aspect, the guiding protrusion 407 and the mating guiding protrusion 436 are additively manufacturing so as to be substantially perpendicular to the seal base 400; while in another aspect, the guiding protrusion 407 and the mating guiding protrusion 436 are additively manufacturing so as to be angled relative to the seal base 400. In one aspect, one of the guiding protrusion 407 and the mating guiding protrusion 436 is additively manufactured in a form of a rib 490 and another of the guiding protrusion 407 and the mating guiding protrusion 436 is additively manufactured in a form of a channel 491 configured to receive the rib 490; while in another aspect, one of the guiding protrusion 407 and the mating guiding protrusion 436 is additively manufactured in a form of a post 495 and another of the guiding protrusion 407 and the mating guiding protrusion 436 is additively manufactured in a form of a stanchion 496 having a recess configured to receive the post 495.

The method of forming the seal 200 may further include additively manufacturing the cover 430 with the rollers 900 (FIG. 12, Block 1224) so that the rollers 900 are captured by the cover 430 by additively manufactured axles 910 of the cover 430 (FIG. 12, Block 1222). Each axle 910 is additively manufactured so as to extend through a respective roller 900. The method for forming the seal 200 may further include additively manufacturing the bulbous outer surface 435 with a wiper blade 1000 (FIG. 12, Block 1226) extending from the bulbous outer surface 435, the wiper blade 1000 being configured to engage the second structure 220 so as to form a seal with the second structure 220.

In one aspect, additively manufacturing the seal 200 includes additively manufacturing the seal base 400 so as to comprise a fastener aperture 480 and a fastener seating surface 485 surrounding the fastener aperture 480. The cover 430 and the resilient lattice body 420 are additively manufactured so as to form a fastener pass-through 481 aligned with the fastener aperture 480. In one aspect, the seal 200 is additively manufactured so as to have a longitudinally elongated configuration having a first end 470 and a second end 471, the first end 470 having a lateral width 472 that is less than another lateral width 473 of the second end 471 so as to form a wedge shaped seal. In one aspect, the seal 200 is additively manufactured so as to include seal extensions 300 on the second end 471 that extend from the second end 471 so as to diverge from one another.

Referring to FIGS. 13, 2A, 2B and 2C, a method of using the seal 200 to seal the space 290 between the first structure 210 and a second structure 220 that is movable relative to the first structure 210 will be described. The method of using the seal 200 comprises engaging both the first structure 210 and the second structure 220 with the seal 200 (FIG. 13, Block 1300) so as to seal the space with the second structure 220 in a first position 294 relative to the first structure 210. The second structure 220 is disengaged from at least a portion of the seal 200 (FIG. 13, Block 1310) with the second structure 220 in a second position 295 relative to the first structure 210 so that at least a portion of the space 290 is unsealed, where the second structure 220 swipes across the seal 200 in direction 277 moving between the first position 294 and the second position 295. The seal 200 is compressed along an entire length of the seal 200 with the second structure 220 in the first position 294. The seal 200 is at least partially uncompressed with the second structure 220 in the second position 295.

The following are provided in accordance with the aspects of the present disclosure:

A1. A seal 200 for sealing a space 290 between a first structure 210 and second structure 220, the seal 200 comprising:

a seal base 400 configured to couple with the first structure 210 so as to form a respective seal with the first structure 210;

a resilient lattice body 420 coupled to the seal base 400; and a cover 430 comprising an inner surface 431 coupled to the resilient lattice body 420 in an opposing relationship relative to the seal base 400 so that the cover 430 moves towards and away from the seal base 400 in a biasing direction of the resilient lattice body 420, and a bulbous outer surface 435 configured to engage the second structure 220 so as to form a respective seal with the second structure 220.

A2. The seal 200 of paragraph A1, wherein the bulbous outer surface 435 has a contour that is configured to substantially prevent a dragging movement of the cover 430 as the second structure 220 moves relative to the first structure 210 in a swiping motion transverse to the biasing direction.

A3. The seal 200 of paragraph A1, wherein:

the resilient lattice body 420 comprises lateral sides 421;

the seal base 400 comprises base sides 401 that extend along the lateral sides 421; and the cover 430 comprises cover sides 432 that extend along the lateral sides 421 so that movement of the cover 430 in the biasing direction is guided by the base sides 401 and lateral sides 421.

A4. The seal 200 of paragraph A1, wherein movement of the cover 430 in the biasing direction is an unguided movement.

A5. The seal 200 of paragraph A1, wherein:

the seal base 400 comprises a guiding protrusion 407 that extends at least partially through the resilient lattice body 420 towards the cover 430; and the inner surface 431 of the cover 430 comprises a mating guiding protrusion 436 that extends at least partially through the resilient lattice body 420 towards the seal base 400, the mating guiding protrusion 436 being configured to mate with the guiding protrusion 407 so as to guide movement of the cover 430 in the biasing direction.

A6. The seal 200 of paragraph A5, wherein the guiding protrusion 407 and the mating guiding protrusion 436 are substantially perpendicular to the seal base 400.

A7. The seal 200 of paragraph A5, wherein the guiding protrusion 407 and the mating guiding protrusion 436 are angled relative to the seal base 400.

A8. The seal 200 of paragraph A5, wherein one of the guiding protrusion 407 and the mating guiding protrusion 436 comprises a rib 490 and another of the guiding protrusion 407 and the mating guiding protrusion 436 comprises a channel 491 configured to receive the rib 490.

A9. The seal 200 of paragraph A5, wherein one of the guiding protrusion 407 and the mating guiding protrusion 436 comprises a post 495 and another of the guiding protrusion 407 and the mating guiding protrusion 436 comprises a stanchion 496 having a recess configured to receive the post 495.

A10. The seal 200 of paragraph A1, wherein the bulbous outer surface 435 of the cover 430 comprises rollers 900 configured to movably engage the second structure 220, the cover 430 being additively manufactured with the rollers 900 so that the rollers 900 are captured by the cover 430 by additively manufactured axles 910 of the cover 430, each axle 910 extending through a respective roller 900.

A11. The seal 200 of paragraph A1, wherein the bulbous outer surface 435 comprises a wiper blade 1000 extending from the bulbous outer surface 435, the wiper blade 1000 being configured to engage the second structure 220 so as to form a seal with the second structure 220.

A12. The seal 200 of paragraph A11, wherein the wiper blade 1000 is additively manufactured with the cover 430 so as to extend from the bulbous outer surface 435.

A13. The seal 200 of paragraph A1, further comprising a friction reducing coating 800 on the bulbous outer surface 435.

A14. The seal 200 of paragraph A1, further comprising a sailcloth layer 810 coupled to the bulbous outer surface 435.

A15. The seal 200 of paragraph A1, wherein the seal base 400 comprises a mounting rail 500 extending from a side of the seal base 400 opposite the resilient lattice body 420, the mounting rail 500 comprising at least one channel 501 configured to mate with a mating channel 510 of the first structure 210.

A16. The seal 200 of paragraph A1, wherein the seal base 400 comprises a mounting flange 600 extending from the seal base 400, in a plane of the seal base 400.

A17. The seal 200 of paragraph A1, wherein:

the seal base 400 comprises a fastener aperture 480 and a fastener seating surface 485 surrounding the fastener aperture 480; and the cover 430 and the resilient lattice body 420 form a fastener pass-through 481 aligned with the fastener aperture 480.

A18. The seal 200 of paragraph A1, wherein the seal base 400, the resilient lattice body 420, and the cover 430 are additively manufactured as a monolithic structure 499.

A19. The seal 200 of paragraph A1, wherein the seal has a longitudinally elongated configuration having a first end 470 and a second end 471, the first end 470 having a lateral width 472 that is less than another lateral width 473 of the second end 471 so as to form a wedge shaped seal.

A20. The seal 200 of paragraph A19, wherein the second end 471 comprises seal extensions 300 that extend from the second end 471 so as to diverge from one another.

A21. The seal 200 of paragraph A20, wherein the seal extensions 300 are formed by the seal base 400, the resilient lattice body 420 and the cover 430.

A22. The seal 200 of paragraph A19, where a longitudinal axis 360 of the seal 200 follows an arcuate path.

A23. The seal 200 of paragraph A1, wherein the seal base 400, the resilient lattice body 420, and the cover 430 comprise a metal.

A24. The seal 200 of paragraph A1, wherein the seal base 400, the resilient lattice body 420, and the cover 430 comprise a polymer.

A25. The seal 200 of paragraph A1, wherein the seal base 400, the resilient lattice body 420, and the cover 430 comprise an elastomer.

B1. An aircraft 100 comprising:

a wing;

a control surface coupled to the wing so as to move relative to the wing; and a seal 200 disposed between the wing and the control surface so as to aerodynamically seal a space between the wing and the control surface, the seal 200 comprising a seal base 400 configured to couple with one of the wing and the control surface so as to form a respective seal with the one of the wing and the control surface, a resilient lattice body 420 coupled to the seal base 400, and a cover 430 comprising an inner surface 431 coupled to the resilient lattice body 420 in an opposing relationship relative to the seal base 400 so that the cover 430 moves towards and away from the seal base 400 in a biasing direction of the resilient lattice body 420, and a bulbous outer surface 435 configured to engage another of the wing and the control surface so as to form a respective seal with the other of the wing and the control surface.

B2. The aircraft 100 of paragraph B1, wherein the wing comprises a main wing 102 of the aircraft 100 and the control surface comprises a slat 110.

B3. The aircraft 100 of paragraph B1, wherein the wing comprises a main wing 102 of the aircraft 100 and the control surface comprises an aileron 111.

B4. The aircraft 100 of paragraph B1, wherein the wing comprises a main wing 102 of the aircraft 100 and the control surface comprises a spoiler 112.

B5. The aircraft 100 of paragraph B1, wherein the wing comprises a main wing 102 of the aircraft 100 and the control surface comprises a flap 113.

B6. The aircraft 100 of paragraph B1, wherein the wing comprises a main wing 102 of the aircraft 100 and the control surface comprises a flaperon 114.

B7. The aircraft 100 of paragraph B1, wherein the wing comprises a horizontal stabilizer 120 of the aircraft 100 and the control surface comprises an elevator 121.

B8. The aircraft 100 of paragraph B1, wherein wing comprises a vertical stabilizer 130 of the aircraft 100 and the control surface comprises a rudder 131.

B9. The seal 200 of paragraph B1, wherein the bulbous outer surface 435 has a contour that is configured to substantially prevent a dragging movement of the cover 430 as the control surface moves relative to the wing in a swiping motion transverse to the biasing direction.

B10. The seal 200 of paragraph B1, wherein:
the resilient lattice body 420 comprises lateral sides 421;
the seal base 400 comprises base sides 401 that extend along the lateral sides 421; and
the cover 430 comprises cover sides 432 that extend along the lateral sides 421 so that movement of the cover 430 in the biasing direction is guided by the base sides 401 and lateral sides 421.

B11. The seal 200 of paragraph B1, wherein movement of the cover 430 in the biasing direction is an unguided movement.

B12. The seal 200 of paragraph B1, wherein:
the seal base 400 comprises a guiding protrusion 407 that extends at least partially through the resilient lattice body 420 towards the cover 430; and
the inner surface 431 of the cover 430 comprises a mating guiding protrusion 436 that extends at least partially through the resilient lattice body 420 towards the seal base 400, the mating guiding protrusion 436 being configured to mate with the guiding protrusion 407 so as to guide movement of the cover 430 in the biasing direction.

B13. The seal 200 of paragraph B12, wherein the guiding protrusion 407 and the mating guiding protrusion 436 are substantially perpendicular to the seal base 400.

B14. The seal 200 of paragraph B12, wherein the guiding protrusion 407 and the mating guiding protrusion 436 are angled relative to the seal base 400.

B15. The seal 200 of paragraph B12, wherein one of the guiding protrusion 407 and the mating guiding protrusion 436 comprises a rib 490 and another of the guiding protrusion 407 and the mating guiding protrusion 436 comprises a channel 491 configured to receive the rib 490.

B16. The seal 200 of paragraph B12, wherein one of the guiding protrusion 407 and the mating guiding protrusion 436 comprises a post 495 and another of the guiding protrusion 407 and the mating guiding protrusion 436 comprises a stanchion 496 having a recess configured to receive the post 495.

B17. The seal 200 of paragraph B1, wherein the bulbous outer surface 435 of the cover 430 comprises rollers 900 configured to movably engage the other of the wing and the control surface, the cover 430 being additively manufactured with the rollers 900 so that the rollers 900 are captured by the cover 430 by additively manufactured axles 910 of the cover 430, each axle 910 extending through a respective roller 900.

B18. The seal 200 of paragraph B1, wherein the bulbous outer surface 435 comprises a wiper blade 1000 extending from the bulbous outer surface 435, the wiper blade 1000 being configured to engage the other of the wing and the control surface so as to form a seal with the other of the wing and the control surface.

B19. The seal 200 of paragraph B18, wherein the wiper blade 1000 is additively manufactured with the cover 430 so as to extend from the bulbous outer surface 435.

B20. The seal 200 of paragraph B1, further comprising a friction reducing coating 800 on the bulbous outer surface 435.

B21. The seal 200 of paragraph B1, further comprising a sailcloth layer 810 coupled to the bulbous outer surface 435.

B22. The seal 200 of paragraph B1, wherein the seal base 400 comprises a mounting rail 500 extending from a side of the seal base 400 opposite the resilient lattice body 420, the mounting rail 500 comprising at least one channel 501 configured to mate with a mating channel 510 of the one of the wing and the control surface.

B23. The seal 200 of paragraph B1, wherein the seal base 400 comprises a mounting flange 600 extending from the seal base 400, in a plane of the seal base 400.

B24. The seal 200 of paragraph B1, wherein:
the seal base 400 comprises a fastener aperture 480 and a fastener seating surface 485 surrounding the fastener aperture 480; and
the cover 430 and the resilient lattice body 420 form a fastener pass-through 481 aligned with the fastener aperture 480.

B25. The seal 200 of paragraph B1, wherein the seal base 400, the resilient lattice body 420, and the cover 430 are additively manufactured as a monolithic structure 499.

B26. The seal 200 of paragraph B1, wherein the seal 200 has a longitudinally elongated configuration having a first end 470 and a second end 471, the first end 470 having a lateral width 472 that is less than another lateral width 473 of the second end 471 so as to form a wedge shaped seal.

B27. The seal 200 of paragraph B26, wherein the second end 471 comprises seal extensions 300 that extend from the second end 471 so as to diverge from one another.

B28. The seal 200 of paragraph B27, wherein the seal extensions 300 are formed by the seal base 400, the resilient lattice body 420 and the cover 430.

B29. The seal 200 of paragraph B26, where a longitudinal axis 360 of the seal 200 follows an arcuate path.

B30. The seal 200 of paragraph B1, wherein the seal base 400, the resilient lattice body 420, and the cover 430 comprise a metal.

B31. The seal 200 of paragraph B1, wherein the seal base 400, the resilient lattice body 420, and the cover 430 comprise a polymer.

B32. The seal 200 of paragraph B1, wherein the seal base 400, the resilient lattice body 420, and the cover 430 comprise an elastomer.

C1. A method of forming a seal 200, the method comprising:

additively manufacturing a seal base 400 that is configured to couple with a first structure 210 so as to form a respective seal with the first structure 210;

additively manufacturing a resilient lattice body 420 onto the seal base 400; and additively manufacturing a cover 430 onto the resilient lattice body 420 where the cover 430 comprises an inner surface 431 coupled to the resilient lattice body 420 in an opposing relationship relative to the seal base 400 so that the cover 430 moves towards and away from the seal base 400 in a biasing direction of the resilient lattice body 420, and a bulbous outer surface 435 configured to engage a second structure 220 disposed adjacent the first structure 210 so as to form a respective seal with the second structure 220, and so that a space that exists between the first structure 210 and the second structure 220 is sealed by the seal 200.

C2. The method of paragraph C1, wherein the bulbous outer surface 435 is additively manufactured so as to have a contour that is configured to substantially prevent a dragging movement of the cover 430 as the second structure 220 moves relative to the first structure 210 in a swiping motion transverse to the biasing direction.

C3. The method of paragraph C1, further comprising:

additively manufacturing lateral sides 421 on the resilient lattice body 420;

additively manufacturing base sides 401 on the seal base 400 where the base sides 401 extend along the lateral sides 421; and additively manufacturing cover sides 432 on the cover 430 where the cover sides 432 extend along the lateral sides 421 so that movement of the cover 430 in the biasing direction is guided by the base sides 401 and lateral sides 421.

C4. The method of paragraph C1, further comprising:

additively manufacturing a guiding protrusion 407 on the seal base 400 so that the guiding protrusion 407 extends at least partially through the resilient lattice body 420 towards the cover 430; and additively manufacturing a mating guiding protrusion 436 on the inner surface 431 of the cover 430 so that the mating guiding protrusion 436 extends at least partially through the resilient lattice body 420 towards the seal base 400, the mating guiding protrusion 436 being configured to mate with the guiding protrusion 407 so as to guide movement of the cover 430 in the biasing direction.

C5. The method of paragraph C4, wherein the guiding protrusion 407 and the mating guiding protrusion 436 are additively manufacturing so as to be substantially perpendicular to the seal base 400.

C6. The method of paragraph C4, wherein the guiding protrusion 407 and the mating guiding protrusion 436 are additively manufactured so as to be angled relative to the seal base 400.

C7. The method of paragraph C4, wherein one of the guiding protrusion 407 and the mating guiding protrusion 436 is additively manufactured in a form of a rib 490 and another of the guiding protrusion 407 and the mating guiding protrusion 436 is additively manufactured in a form of a channel 491 configured to receive the rib 490.

C8. The method of paragraph C4, wherein one of the guiding protrusion 407 and the mating guiding protrusion 436 is additively manufactured in a form of a post 495 and another of the guiding protrusion 407 and the mating guiding protrusion 436 is additively manufactured in a form of a stanchion 496 having a recess configured to receive the post 495.

C9. The method of paragraph C1, further comprising additively manufacturing the cover 430 with rollers 900 so that the rollers 900 are captured by the cover 430 by additively manufactured axles 910 of the cover 430, each axle 910 extending through a respective roller 900.

C10. The method of paragraph C1, further comprising additively manufacturing the bulbous outer surface 435 with a wiper blade 1000 extending from the bulbous outer surface 435, the wiper blade 1000 being configured to engage the second structure 220 so as to form a seal with the second structure 220.

C11. The method of paragraph C1, further comprising additively manufacturing a mounting rail 500 on the seal base 400 where the mounting rail 500 extends from a side of the seal base 400 opposite the resilient lattice body 420, the mounting rail 500 comprising at least one channel 501 configured to mate with a mating channel 510 of the first structure 210.

C12. The method of paragraph C1, further comprising additively manufacturing a mounting flange 600 on the seal base 400 where the mounting flange 600 extends from the seal base 400, in a plane of the seal base 400.

C13. The method of paragraph C1, wherein:

the seal base 400 is additively manufactured so as to comprise a fastener aperture 480 and a fastener seating surface 485 surrounding the fastener aperture 480; and the cover 430 and the resilient lattice body 420 are additively manufactured so as to form a fastener passthrough 481 aligned with the fastener aperture 480.

C14. The method of paragraph C1, wherein the seal base 400, the resilient lattice body 420, and the cover 430 are additively manufactured as a monolithic structure 499.

C15. The method of paragraph C1, wherein the seal 200 is additively manufactured so as to have a longitudinally elongated configuration having a first end 470 and a second end 471, the first end 470 having a lateral width 472 that is less than another lateral width 473 of the second end 471 so as to form a wedge shaped seal.

C16. The method of paragraph C15, further comprising additively manufacturing seal extensions 300 on the second end 471 that extend from the second end 471 so as to diverge from one another.

C17. The method of paragraph C16, wherein the seal extensions 300 are formed by the seal base 400, the resilient lattice body 420 and the cover 430.

C18. The method of paragraph C15, where a longitudinal axis 360 of the seal 200 follows an arcuate path.

C19. The method of paragraph C1, wherein the seal base 400, the resilient lattice body 420, and the cover 430 comprise a metal.

C20. The method of paragraph C1, wherein the seal base 400, the resilient lattice body 420, and the cover 430 comprise a polymer.

C21. The method of paragraph C1, wherein the seal base 400, the resilient lattice body 420, and the cover 430 comprise an elastomer.

D1. A method of using a seal 200 to seal a space between a first structure 210 and a second structure 220 that is movable relative to the first structure 210, the method comprising:

engaging both the first structure 210 and the second structure 220 with the seal 200 so as to seal the space with the second structure 220 in a first position relative to the first structure 210, where the seal 200 comprises a seal base 400 configured to couple with one of the wing and the control surface so as to form a respective seal with the one of the wing and the control surface, a resilient lattice body 420 coupled to the seal base 400, and a cover 430 comprising an inner surface 431 coupled to the resilient lattice body 420 in an opposing relationship relative to the seal base 400 so that the cover 430 moves towards and away from the seal base 400 in a biasing direction of the resilient lattice body 420, and a bulbous outer surface 435 configured to engage another of the wing and the control surface so as to form a respective seal with the other of the wing and the control surface; and disengaging the second structure 220 from at least a portion of the seal 200 with the second structure 220 in a second position relative to the first structure 210 so that at least a portion of the space is unsealed;

wherein the second structure 220 swipes across the seal 200 moving between the first position and the second position.

D2. The method of paragraph D1, wherein the seal 200 is compressed along an entire length of the seal 200 with the second structure 220 in the first position.

D3. The method of paragraph D1, wherein the seal 200 is at least partially uncompressed with the second structure 220 in the second position.

D4. The method of paragraph D1, wherein the seal 200 is disposed between adjacent slats 110 of an aircraft 100.

D5. The method of paragraph D1, wherein the seal 200 is disposed between adjacent flaps 113 of an aircraft 100.

D6. The method of paragraph D1, wherein the seal 200 is disposed between adjacent ailerons 111 of an aircraft 100.

D7. The method of paragraph D1, wherein the seal 200 is disposed between a flap 113 and adjacent flaperon 114 of an aircraft 100.

D8. The method of paragraph D1, wherein the seal 200 is disposed between adjacent spoilers 112 of an aircraft 100.

D9. The method of paragraph D1, wherein the seal 200 is disposed between adjacent rudders 131 of an aircraft 100.

D10. The method of paragraph D1, wherein the seal 200 is disposed between adjacent elevators 121 of an aircraft 100.

D11. The method of paragraph D1, wherein the seal 200 is disposed between a main wing 102 and a slat 110 of an aircraft 100.

D12. The method of paragraph D1, wherein the seal 200 is disposed between a main wing 102 and a flap 113 of an aircraft 100.

D13. The method of paragraph D1, wherein the seal 200 is disposed between a main wing 102 and a spoiler 112 of an aircraft 100.

D14. The method of paragraph D1, wherein the seal 200 is disposed between a main wing 102 and an aileron 111 of an aircraft 100.

D15. The method of paragraph D1, wherein the seal 200 is disposed between a vertical stabilizer 130 and a rudder 131 of an aircraft 100.

D16. The method of paragraph D1, wherein the seal 200 is disposed between a horizontal stabilizer 120 and an elevator 121 of an aircraft 100.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIGS. 12 and 13, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 12 and 13 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or substantially simultaneously. Additionally, those skilled in the art will appreciate that not all operations described need be performed.

In the foregoing description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts are described in conjunction with specific examples, it will be understood that these examples are not intended to be limiting.

Unless otherwise indicated, the terms "first", "second", etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus (es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A seal for sealing a space between a first structure and second structure, the seal comprising:
   a seal base configured to couple with the first structure so as to form a respective seal with the first structure;
   a resilient lattice body coupled to the seal base; and
   a cover comprising
      an inner surface coupled to the resilient lattice body in an opposing relationship relative to the seal base so that the cover moves towards and away from the seal base in a biasing direction of the resilient lattice body, and
      a bulbous outer surface configured to engage the second structure so as to form a respective seal with the second structure.

2. The seal of claim 1, wherein the bulbous outer surface has a contour that is configured to substantially prevent a dragging movement of the cover as the second structure moves relative to the first structure in a swiping motion transverse to the biasing direction.

3. The seal of claim 1, wherein:
   the resilient lattice body comprises lateral sides;
   the seal base comprises base sides that extend along the lateral sides; and
   the cover comprises cover sides that extend along the lateral sides so that movement of the cover in the biasing direction is guided by the base sides and lateral sides.

4. The seal of claim 1, wherein movement of the cover in the biasing direction is an unguided movement.

5. The seal of claim 1, wherein:
   the seal base comprises a guiding protrusion that extends at least partially through the resilient lattice body towards the cover; and
   the inner surface of the cover comprises a mating guiding protrusion that extends at least partially through the resilient lattice body towards the seal base, the mating guiding protrusion being configured to mate with the guiding protrusion so as to guide movement of the cover in the biasing direction.

6. The seal of claim 1, wherein the bulbous outer surface of the cover comprises rollers configured to movably engage the second structure, the cover being additively manufactured with the rollers so that the rollers are captured by the cover by additively manufactured axles of the cover, each axle extending through a respective roller.

7. The seal of claim 1, wherein the bulbous outer surface comprises a wiper blade extending from the bulbous outer surface, the wiper blade being configured to engage the second structure so as to form a seal with the second structure.

8. The seal of claim 1, wherein the seal base, the resilient lattice body, and the cover are additively manufactured as a monolithic structure.

9. The seal of claim 1, wherein the seal has a longitudinally elongated configuration having a first end and a second end, the first end having a lateral width that is less than another lateral width of the second end so as to form a wedge shaped seal.

10. The seal of claim 9, wherein the second end comprises seal extensions that extend from the second end so as to diverge from one another.

11. The seal of claim 1, wherein the seal base, the resilient lattice body, and the cover comprise one or more of a metal, a polymer, and an elastomer.

12. An aircraft comprising:
   a wing;
   a control surface coupled to the wing so as to move relative to the wing; and
   a seal disposed between the wing and the control surface so as to aerodynamically seal a space between the wing and the control surface, the seal comprising
      a seal base configured to couple with one of the wing and the control surface so as to form a respective seal with the one of the wing and the control surface,
      a resilient lattice body coupled to the seal base, and
      a cover comprising
         an inner surface coupled to the resilient lattice body in an opposing relationship relative to the seal base so that the cover moves towards and away from the seal base in a biasing direction of the resilient lattice body, and a bulbous outer surface configured to engage another of the wing and the control surface so as to form a respective seal with the other of the wing and the control surface.

13. The aircraft of claim 12, wherein the wing comprises a main wing of the aircraft and the control surface comprises one or more of a slat, an aileron, a spoiler, a flap, and a flaperon.

14. The aircraft of claim 12, wherein the wing comprises a horizontal stabilizer of the aircraft and the control surface comprises an elevator.

15. The aircraft of claim 12, wherein wing comprises a vertical stabilizer of the aircraft and the control surface comprises a rudder.

16. A method of forming a seal, the method comprising:
additively manufacturing a seal base that is configured to couple with a first structure so as to form a respective seal with the first structure;
additively manufacturing a resilient lattice body onto the seal base; and
additively manufacturing a cover onto the resilient lattice body where the cover comprises
an inner surface coupled to the resilient lattice body in an opposing relationship relative to the seal base so that the cover moves towards and away from the seal base in a biasing direction of the resilient lattice body, and
a bulbous outer surface configured to engage a second structure disposed adjacent the first structure so as to form a respective seal with the second structure, and so that a space that exists between the first structure and the second structure is sealed by the seal.

17. The method of claim 16, further comprising:
additively manufacturing a guiding protrusion on the seal base so that the guiding protrusion extends at least partially through the resilient lattice body towards the cover; and
additively manufacturing a mating guiding protrusion on the inner surface of the cover so that the mating guiding protrusion extends at least partially through the resilient lattice body towards the seal base, the mating guiding protrusion being configured to mate with the guiding protrusion so as to guide movement of the cover in the biasing direction.

18. The method of claim 16, further comprising additively manufacturing the cover with rollers so that the rollers are captured by the cover by additively manufactured axles of the cover, each axle extending through a respective roller.

19. The method of claim 16, wherein the seal base, the resilient lattice body, and the cover are additively manufactured as a monolithic structure.

20. The method of claim 16, wherein the seal base, the resilient lattice body, and the cover comprise one or more of a metal, a polymer, and an elastomer.

* * * * *